United States Patent [19]
Nakamura

[11] Patent Number: 5,461,457
[45] Date of Patent: Oct. 24, 1995

[54] METHOD OF DETERMINING AMOUNT OF EXPOSURE

[75] Inventor: Hiroaki Nakamura, Kanagawa, Japan

[73] Assignee: Fuji Photo Film Co., Ltd., Tokyo, Japan

[21] Appl. No.: 153,088

[22] Filed: Nov. 17, 1993

[30] Foreign Application Priority Data

Nov. 25, 1992 [JP] Japan .................................. 4-315258
Nov. 25, 1992 [JP] Japan .................................. 4-315259

[51] Int. Cl.$^6$ ..................................................... G06K 9/46
[52] U.S. Cl. ................................ 355/77; 355/38; 355/71; 355/41
[58] Field of Search .............................. 355/35, 38, 68, 355/71, 41

[56] References Cited

U.S. PATENT DOCUMENTS 5,278,921  1/1994  Nakamura et al. ..................... 382/18
5,289,277  2/1994  Kinjo ..................................... 354/402

Primary Examiner—Michael L. Gellner
Assistant Examiner—D. P. Malley
Attorney, Agent, or Firm—Sughrue, Mion, Zinn, Macpeak & Seas; Richard C. Turner; Joseph Bach

[57] ABSTRACT

A method of determining an amount of exposure in a process of reproducing a face density, which is extracted from an original image of a photographed human subject, at a target density. When there are a plurality of people among photographed subjects and face densities differ greatly, the face densities are divided into two groups of higher and lower face densities. Thereafter, the face density of a group which is determined to be a standard density is finished as an appropriate density. Further, in a process of effecting reproduction at the target density, density correction of a face is not effected in a case in which a face density of a photographed subject is extremely high.

16 Claims, 16 Drawing Sheets

ORIGINAL IMAGE

METHOD OF DETERMINING AMOUNT OF EXPOSURE

BACKGROUND OF THE INVENTION

1. Field of the Invention

The present invention relates to a method of determining an amount of exposure, and in particular, to a method of determining an amount of exposure in which when a color original image is copied onto a color copy material or a black-and-white copy material, density data of a human face is extracted, and an amount of exposure is determined on the basis of the extracted density data.

2. Description of the Related Art

When a photograph of a person is viewed, the area which is most noticed is the person's face. In order to produce high-quality photographs or images, it is necessary to print or display the color of a human face at an appropriate color.

Conventionally, when an image containing a person is printed or displayed at a printer, a printing device, or a photographic processing apparatus such as an image display device, face density data is extracted. On the basis of the extracted density data, the face density is reproduced as an appropriate density which is a target density, and an amount of exposure is determined so that the color of the face can be printed or displayed appropriately.

However, this method presupposes that there is a single reflectance of human faces. In a color image, when there are faces of a plurality of different reflectances which differ due to individual differences or differences between races, a drawback arises in that there is a dispersion of face densities, and correction for printing or displaying at appropriate colors in accordance with the face densities cannot be effected.

In order to solve this drawback, a system has been proposed in which correction is effected by using the average value of the densities of a plurality of faces as the face density. However, as is well-known, the reflectances of faces differ greatly among different races. Namely, as illustrated in FIG. 14, in the spectral reflectance characteristic of skins of six races from Caucasian to Negro, (in FIG. 14, Z1: blond Caucasian, Z2: brunette Caucasian, Z3: Asian, Z4: Hindu, Z5: mulatto, Z6: Negro) there is a difference of seven to eight times between Caucasians and Negroes (from the Japan Color Society, "Color Science Handbook: New Edition", Chapter 28: Skin Colors and Make-up Colors, Tokyo University Publishing Group, page 1097, 1985). Accordingly, when correction is effected by simply using the average value of the densities of a plurality of faces as the face density, there is a drawback in that the densities of some of the faces will not be finished at the appropriate density.

SUMMARY OF THE INVENTION

In view of the aforementioned, an object of the present invention is to provide a method of determining an amount of exposure in which an amount of exposure is determined such that a color original image such as a negative film or the like can be reproduced at an appropriate density from data which is extracted from the color original image for a human face.

A first aspect of the present invention is a method of determining an amount of exposure including the steps of: dividing a color original image into a plurality of pixels, breaking down each of the pixels into three colors of red light, green light and blue light, and photometrically measuring the red light, green light and blue light; determining, on the basis of data obtained by photometry, color regions on said color original image in which hue or hue and saturation are the same of are similar; judging whether a determined color region is a human face region; determining a density of a region judged to be a human face region; classifying the human face regions into density groups based on determined densities when a difference between a maximum value and a minimum value of the determined densities exceeds a predetermined value; and selecting at least one of classified density groups and determining an amount of exposure for a copy material on the basis of a selected density group.

A second aspect of the present invention is a method of determining an amount of exposure including the steps of: dividing a color original image into a plurality of pixels, breaking down each of the pixels into three colors of red light, green light and blue light, and photometrically measuring the red light, green light and blue light; determining a histogram of hue values based on data obtained by photometry; dividing said determined histogram per mountain; judging to which of the divided mountains each pixel of said color original image belongs so as to divide the pixels into groups corresponding to the divided mountains, and dividing said color original image into the respective groups; determining at least one of an outline and an inner structure of each of the divided regions so as to judge whether the region is a human face; determining a density of a region judged to be a human face region; classifying the human face regions into groups of similar densities on the basis of determined densities when a difference between a maximum value and a minimum value of the determined densities exceeds a predetermined value; and selecting at least one of classified density groups and determining an amount of exposure for a copy material on the basis of a selected density group.

A third aspect of the present invention is a method of determining an amount of exposure including the steps of: dividing a color original image into a plurality of pixels, breaking down each of said pixels into three colors of red light, green light and blue light, and photometrically measuring the red light, green light and blue light; determining, on the basis of data obtained by photometry, a two-dimensional histogram for hue values and saturation values; dividing said determined two-dimensional histogram per mountain; determining at least one of an outline and an inner structure of each of the divided regions so as to judge whether the region is a human face; determining a density of a region judged to be a human face region; classifying the human face regions into groups of similar densities on the basis of determined densities when a difference between a maximum value and a minimum value of the determined densities exceeds a predetermined value; and selecting at least one of classified density groups and determining an amount of exposure for a copy material on the basis of a selected density group.

A fourth aspect of the present invention is a method determining an amount of exposure including the steps of: dividing a color original image into a plurality of pixels, breaking down each of the pixels into three colors of red light, green light and blue light, and photometrically measuring the red light, green light and blue light; determining, on the basis of data obtained by photomerry, color regions on said color original image in which hue or hue and saturation are the same or are similar; judging whether a determined color region is a human face region; determining a density of a region judged to be a human face region; determining an amount of exposure for a copy material with correction, on the basis of a density of a region, for a color original image in which a reflectance of a face of a human who is a photographed subject corresponding to the determined density is greater than or equal to a predetermined value; and determining an amount of exposure for a copy material without effecting correction, on the basis of a density off a region, for a color original image in which a reflectance of a face of a human who is a photographed subject corresponding to the determined density is less than a predetermined value.

In the first aspect of the present invention, a color original image is divided into a plurality of pixels which are each broken down into three colors of red light, green light and blue light, and the red light, green light and blue light are photometrically measured. Color regions on the color original image in which the hue or the hue and saturation are the same or similar are determined on the basis of the data obtained by photometry. Next, it is judged whether a determined color region is a human face region. In determining face regions from similar color regions, determination can be effected on the basis of a histogram for the hue or for the hue and the saturation. Subsequently, a density of a region judged to be a human face region is determined. When a difference between a maximum value and a minimum value of the determined densities exceeds a predetermined value, the human face regions are classified into groups of similar densities based on the determined densities. The densities of face regions belonging to a classified group are similar, that is, they are close. For example, in a color original image, when there are a plurality of face regions having different densities such that the predetermined value is exceeded, the respective face regions are divided into density groups. At least one of the classified density groups is selected, and an amount of exposure for a copy material is determined on the basis of the selected density group. Accordingly, even if there exists on the color original image a plurality of face regions having different densities such that the predetermined value is exceeded, by using the face density, correction can be effected on the basis of the density of the face region for which correction is necessary, without effecting correction on the basis of the densities of all of the face regions. In this correction, the amount of exposure for the copy material can be determined so that the density, e.g., average density, of a density group, which includes regions in which the reflectance of a face of a human who is a photographed subject is greater than or equal to a predetermined value, becomes a standard density. Accordingly, the density of a density group including face regions for which it is necessary to effect correction by using the face density, can be corrected.

In the second aspect of the present invention, a color original image is divided into a plurality of pixels which are each broken down into three colors of red light, green light and blue light, and the red light, green light and blue light are photometrically measured. A histogram of hue values is determined based on data obtained by photometry. Next, the determined histogram is divided per mountain by using the valleys or the foot portions of the mountains as boundaries. The range of hue values for each mountain is thereby determined. By determining, for each pixel, to which hue value range the hue value of the pixel belongs, it is determined to which of the divided mountains each pixel belongs. The plurality of pixels are divided into groups (clusters) corresponding to the mountains. Next, the color original image is divided into regions corresponding to the divided groups. At this time, pixels belonging to the same group may be classified into different regions, but pixels included in different groups cannot be included in the same region. Accordingly, the color original image is divided into regions including pixels having hue values within a hue value range divided by the histogram. Pixels whose hue values are within a predetermined range are included within one region on the color original image. It is obvious that an outline of a human face is different than outlines of other areas, and the structure of the inner portion of a human face is different than the structures of inner portions of other areas. Therefore, for each region, if at least one of the outline and the inner structure is determined, a determination can be made as to whether that region is a human face. Accordingly, in the present invention, even if there are variations in the hue or the color range of a color original image due to variations in the type of film and the type of light source, variations over time, differences in film developing or the like, a human face can be determined.

In the third aspect of the present invention, saturation values are derived in addition to the hue values, and a two-dimensional histogram for hue values and saturation values is determined. The two-dimensional histogram is divided per mountain, and the color original image is divided in the same way as described above. At east one of the outline and the inner structure of the divided region is determined so as to determine whether the region is a human face. In this way, in the present invention, because hue values and saturation values are used, even if there exist regions in which the hue is similar to or the same as the hue of a human face (e.g., ground, wood or the like), data of a human face can be extracted. Namely, although the hue of a human face may be similar to the flesh-colored portions of the ground, a tree or the like, the saturation values thereof differ in most cases. Therefore, if data of a human face is extracted on the basis of a two-dimensional histogram for hue values and saturation values, a human face can be determined even if faces, the around, trees and the like are included in the same image.

In the Fourth aspect of the present invention, a color original image is divided into a plurality of pixels which are each broken down into three colors of red light, green light and blue liaht, and the red light, green light and blue light are photometrically measured. Color regions on the color original image in which the hue or the hue and saturation are the same or similar are determined on the basis of the data obtained by photometry. Next, it is judged whether a determined color region is a human face region. In determining face regions from similar color regions, determination can be effected on the basis of a histogram for the hue or a two-dimensional histogram for the hue and the saturation. Subsequently, densities of regions judged to be human face regions are determined. It can be estimated whether the reflectance of a human face corresponding to the determined density is greater than or equal to a predetermined value. Namely, as the reflectance of a face of a human who is a photographed subject decreases, the density on the color negative film decreases, and the density on the reversal film increases. When the reflectance of the face of a human who is the photographed subject is low, if correction of the amount of exposure of the color original image is effected by using the density of the face region, the other regions become underexposed or overexposed so that exposure cannot be carried out appropriately. In the present invention, for a color original image in which the reflectance of the face of a human who is the photographed subject is greater than or equal to a predetermined value, correction is effected based on the density of that region, and the amount of exposure for the copy material is determined. Correction can be effected so that the average density of the face region becomes a standard density. With respect to a color original image in which the reflectance of the face of a human who is the photographed subject is less than a predetermined value, the amount of exposure for the copy material is determined without effecting correction based on the density of the region. In this way, correction is effected on the basis of the density of the face region only for those color original images in which the reflectance of the face of a human who is the photographed subject is greater than or equal to a predetermined value. Therefore, for example, when the reflectance of the face of a human who is the photographed subject is extremely low due to the person's race or a suntan or the like, the appropriate amount of exposure can be determined without effecting correction by using the face.

Among color original images in which the reflectance of the face of the human who is the photographed subject is less than the predetermined value, there are included color original images in which the reflectance of the face is low due to photographing conditions regardless of the actual reflectance of the face. For example, when the actual reflectance of the human face is standard and there was weak rear light or overall underexposure, the density of the human face region on the negative film is low in the same way as a case in which the reflectance of the face is low. Therefore, in the present invention, when the determined density exceeds an upper limit value or is less than a lower limit value, the amount of exposure for the copy material is determined without correction being effected on the basis of the density of the region. When the determined density is included in a predetermined range between the upper limit value and the lower limit value, the amount of exposure for the copy material is determined on the basis of the density of that region. Accordingly, when the reflectance of the face of a human who is the photographed subject is low, correction is not effected, and when the actual reflectance of the human face is standard and there is weak rear light or overall underexposure, correction can be effected.

Further, when a human face whose actual reflectance is low is photographed with electronic flash exposure, the density of the face is included in the above-mentioned predetermined range for correction. Generally, the density distribution of a color original image photographed with electronic flash exposure can be divided broadly into an area where light was illuminated and an area where light was not illuminated. In the present invention, when the determined density is included in a predetermined range between an upper limit value and a lower limit value, a histogram of the densities of the color regions other than those regions assumed to be human face regions is determined. Based on the determined histogram, it is assumed whether there was electronic flash exposure. At times other than those when it is assumed that there was electronic flash exposure, the amount of exposure for the copy material is determined on the basis of the density of the region. Accordingly, when a human face whose actual reflectance is low is photographed with electronic flash exposure, the optimal amount of exposure can be determined without effecting correction by use of the density of the face.

In accordance with the present invention having the above-described structure, an amount of exposure is determined based on the density of a density group of similar densities which is classified on the basis of densities of face regions. Therefore, even if a plurality of face regions of different reflectances are included in an original image, an optimal density can be obtained for each of the face regions without the obtained density being biased.

Further, in accordance with the present invention, for color original images in which the reflectance of the face of a human who is the photographed subject is greater than or equal to a predetermined value, correction is effected on the basis of the density of a region. Therefore, even in cases in which the reflectance of a face of a human who is the photographed subject is extremely low compared to standard values due to individual or racial differences or the like, the amount of exposure can be determined such that an optimal density can be obtained.

DESCRIPTION OF THE PREFERRED EMBODIMENTS

Figure 1:
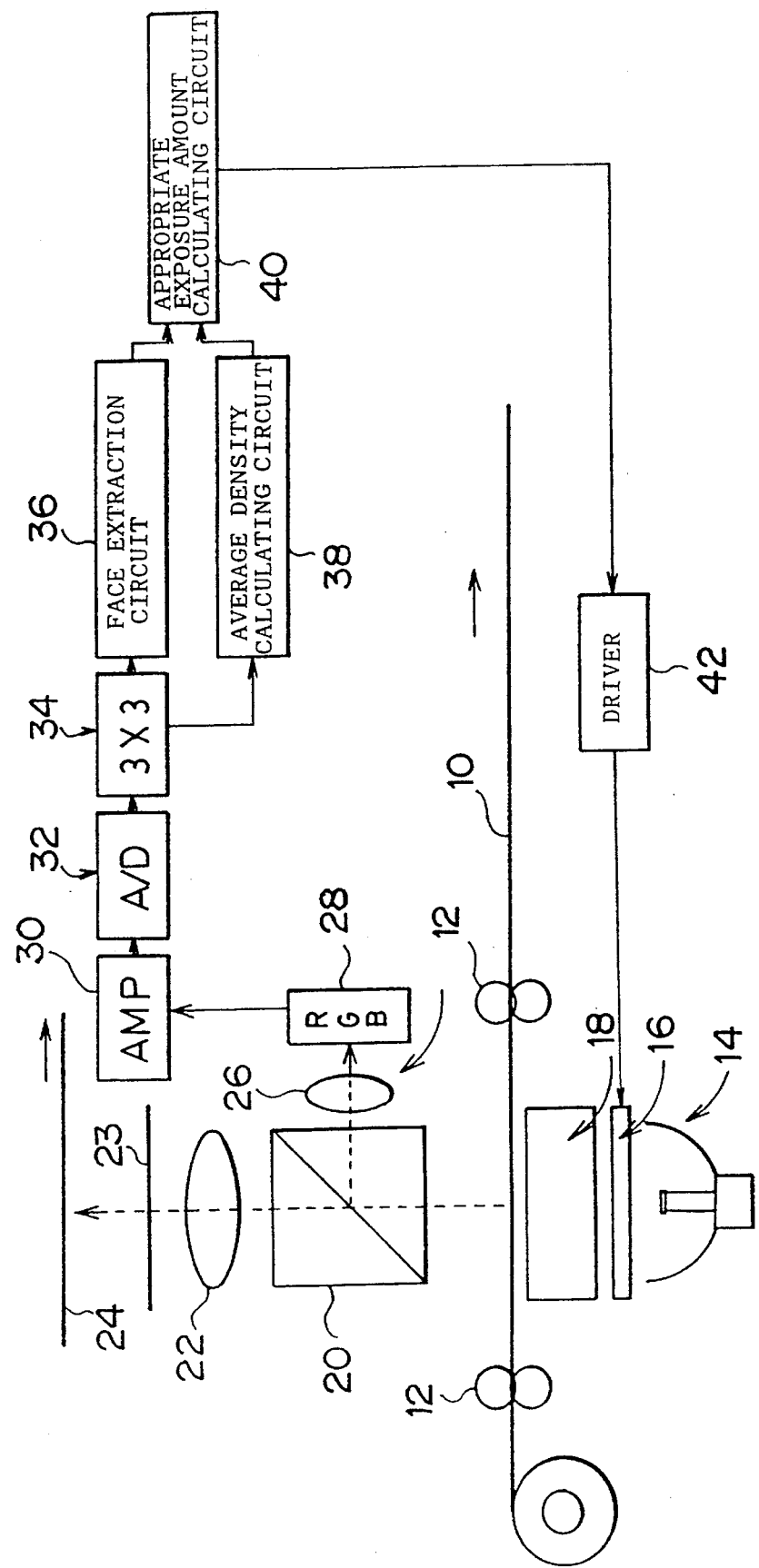
FIG. 1 is a schematic view illustrating a printer of a first embodiment of the present invention.

A first embodiment of the present invention will be described in detail with reference to the drawings. In the present embodiment, the present invention is applied to an automatic printer. As illustrated in FIG. 1, the automatic printer of the present embodiment is equipped with conveying rollers 12 which convey a color negative film 10. A light source 14, a color correction filter 16 such as a light-adjusting filter and a diffusion box 18 are disposed in that order beneath the color negative film 10 which is being conveyed by the conveying rollers 12. A distribution prism 20 which distributes in two directions the light transmitted through the negative film 10 is disposed above the negative film 10. A projecting optical system 22, a black shutter 23, and a color paper (photographic printing paper 24) are disposed in that order on one of the optical paths distributed by the distribution prism 20. A projecting optical system 26 and a CCD image sensor 28 are disposed in that order on the other optical path. The CCD image sensor 28 divides an entire single image (single frame) of the negative film 10 into a plurality of pixels (for example, 256×256 pixels), divides each pixel into R (red), G (green) and B (blue), and photometrically measures the R, G, B. The CCD image sensor 28 is connected, via an amplifier 30 which amplifies the output of the CCD image sensor and an analog-digital (A/D) converter 32, to a 3×3 matrix circuit 34 for correcting the sensitivity of the CCD image sensor 28. The 3×3 matrix circuit 34 is connected to an appropriate exposure amount calculating circuit 40 via a face extraction circuit 36 which is formed of a microcomputer in which a program of a routine, which will be described later, is stored. Further, the 3×3 matrix circuit 34 is connected to the appropriate exposure amount calculating circuit 40 via an average density calculating circuit 38 which calculates an average density of an entire single image. The appropriate exposure amount calculating circuit 40 is connected to the color correction filter 16 via a driver 42 which drives the color correction filter 16. The appropriate exposure amount calculating circuit 40 is formed of a microcomputer in which a program of a routine (FIG. 9), which will be described later, is stored.

Next, operation of the present embodiment will be described. Light irradiated from the light source 14 is transmitted through the color correction filter 16, the diffusion box 18, and the color negative film 10, is distributed by the distribution prism 20, and is received by the CCD image sensor 28 via the projecting optical system 26. At this time, the black shutter 23 is closed. The CCD image sensor 28 receives the light, divides an entire single image into a plurality of pixels, divides each pixel into the three colors of R, G, B, photometrically measures the R, G, B, and outputs a photometric data signal. After the photometric data signal is amplified at the amplifier 30, the signal is converted into a digital signal at the A/D converter 32. Correction of the sensitivity of the image sensor is effected at the 3×3 matrix circuit 34, and the photometric data signal is input to the face extraction circuit 36 and the average density calculating circuit 38. The average density for one entire image is calculated at the average density calculating circuit 38. At the face extraction circuit 36, a region of a face of a human in an image is estimated, and the photometric data of the three colors R, G, B of the region assumed to be the face is output, as will be explained later. The exposure amount calculating circuit 40 uses the three color photometric data, which was outputted from the face extraction circuit 36, and the average density, which was determined at the average density calculating circuit 38, to calculate the amount of exposure. The exposure amount calculating circuit 40 controls the color correction filter 16 via the driver 42 and opens and closes the black shutter 23 so that printing is effected. When the average density calculated at the average density calculating circuit 38 is used, the exposure correction amount with respect to the average density can be determined. If the exposure correction amount is not determined, the average density calculating circuit 38 does not have to be employed, and the amount of exposure may be determined directly from the three color photometric data outputted from the face extraction circuit 36.

Figure 2:
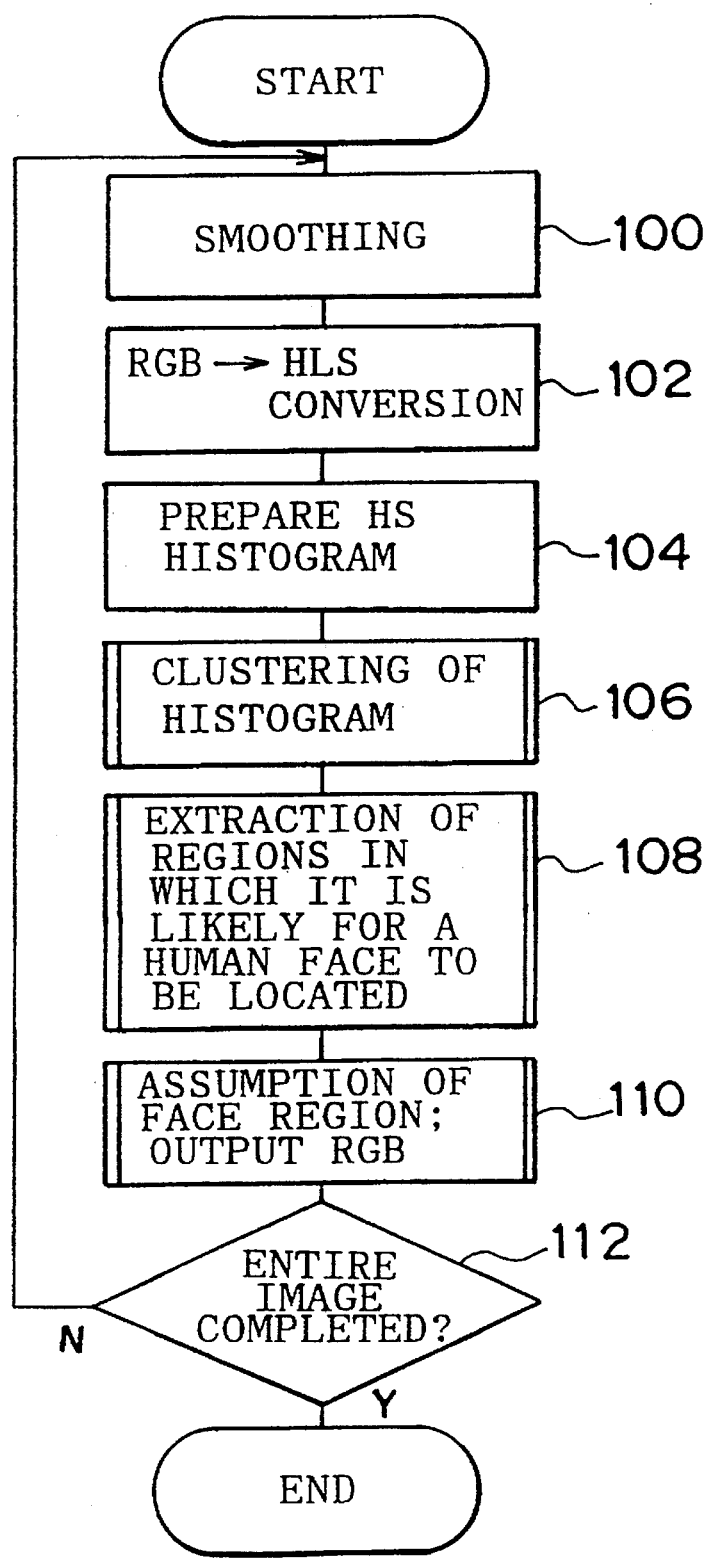
FIG. 2 is a flow diagram illustrating a face extraction routine of a face extraction circuit.
Figure 3:
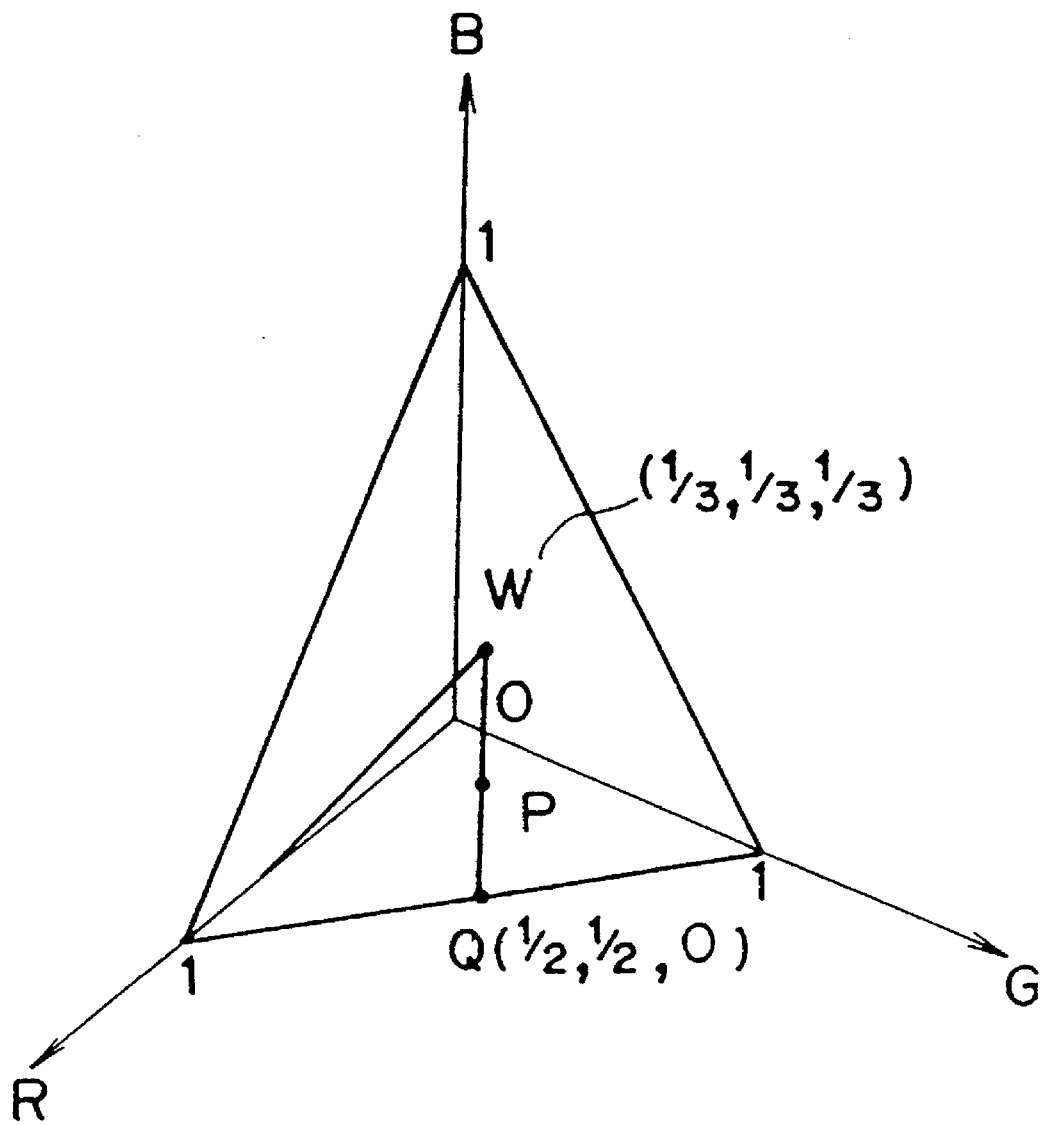
FIG. 3 is a line diagram illustrating a color coordinate.

FIG. 2 illustrates a face extraction routine of the face extraction circuit 36. In step 100, noise removal, i.e., smoothing, of the three-color photometric data is effected. In subsequent step 102, the three color photometric data R, G, B is converted to H (hue value), L (lightness value), and S (saturation value) by the following formulae (1) through (3):

$$L=(R+G+B)/3 \quad (1)$$

$$S=1-min(r', g', b') \quad (2)$$

$$H=H'/2P_i \quad (3)$$

wherein R, G, B are three color photometric data which are standardized such that the respective minimum values thereof are zero and the respective maximum values thereof are 1 as illustrated by the three-dimensional color coordinate of FIG. 3; min( ) is the minimum value of the number in the parentheses; and r', g', b' are respectively defined as r'=R/L, g'=G/L, b'=B/L. Further, H' is determined by following formula (4) in which $P_i$ is P in FIG. 3 (i is one of R, G, B).

$$H' = \frac{Pi}{2} - \tan^{-1}\frac{x}{1-x^2} \quad (4)$$

wherein $$x = \frac{2(R-L)^2 + (G-L)^2 + (B-L)^2}{6L(R-L)^2 + (G-L)^2 + (B-L)^2} \quad (5)$$

Figure 4A:
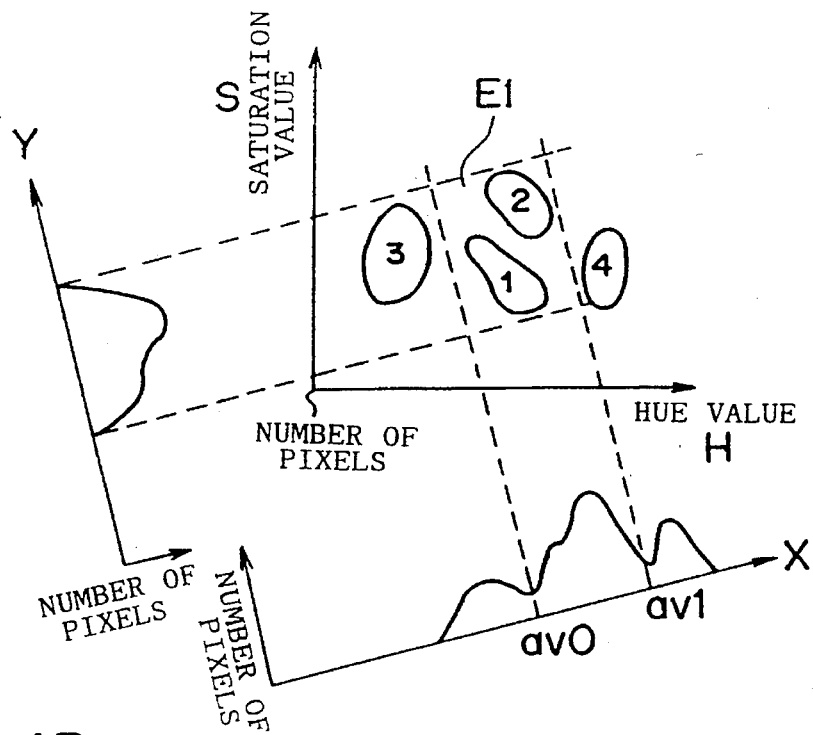
FIG. 4A is a line diagram illustrating a two-dimensional histogram for hue values and saturation values.

In step 104, as illustrated in FIG. 4A, a two-dimensional histogram for hue values and saturation values is determined by using the coordinate system formed by the hue value axis, the saturation value axis and the number of pixels axis, which are perpendicular to each other. In step 106, as will be described later, the determined two-dimensional histogram is divided per mountain, i.e., clustering of the two-dimensional histogram is effected. In step 108, clustering of a plurality of pixels is effected on the basis of the mountains of the clustered two-dimensional histogram. Based on the clustering of the pixels, the image is divided, and regions in which it is likely that a character's face will be located are extracted from the divided regions. In step 110, a region among the extracted regions in which it is likely for a human face to be located is assumed to be the face region. Photometric data for the three colors R, G, B are output for the region assumed to be the face region. In step 112, a determination is made as to whether printing of the entire image has been completed. When a determination is made that printing has been completed, the routine ends.

Figure 4B:
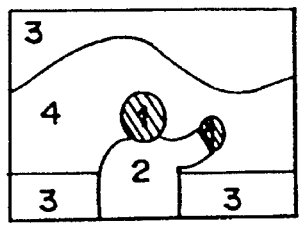
FIG. 4B is a line diagram illustrating a state in which the original image is divided.
Figure 4C:
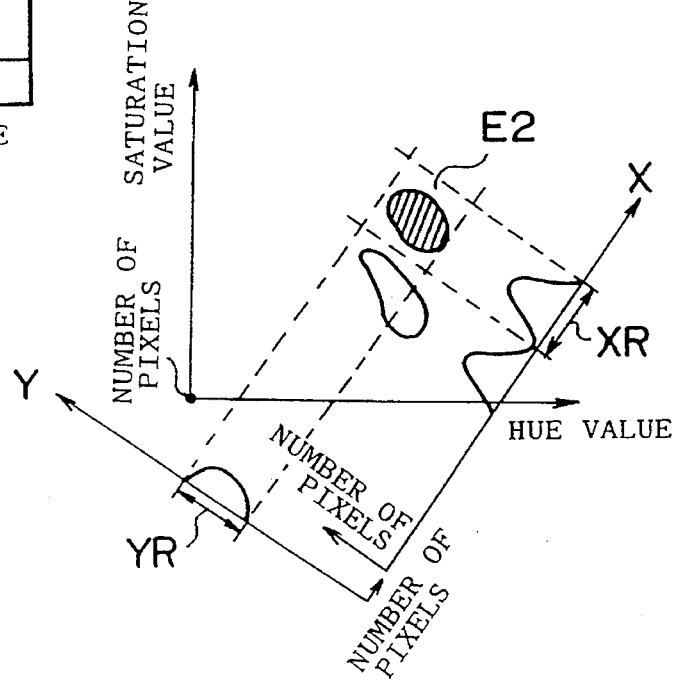
FIG. 4C is a line diagram illustrating a state in which single-peak mountains are cut out from the two-dimensional histogram.
Figure 5:
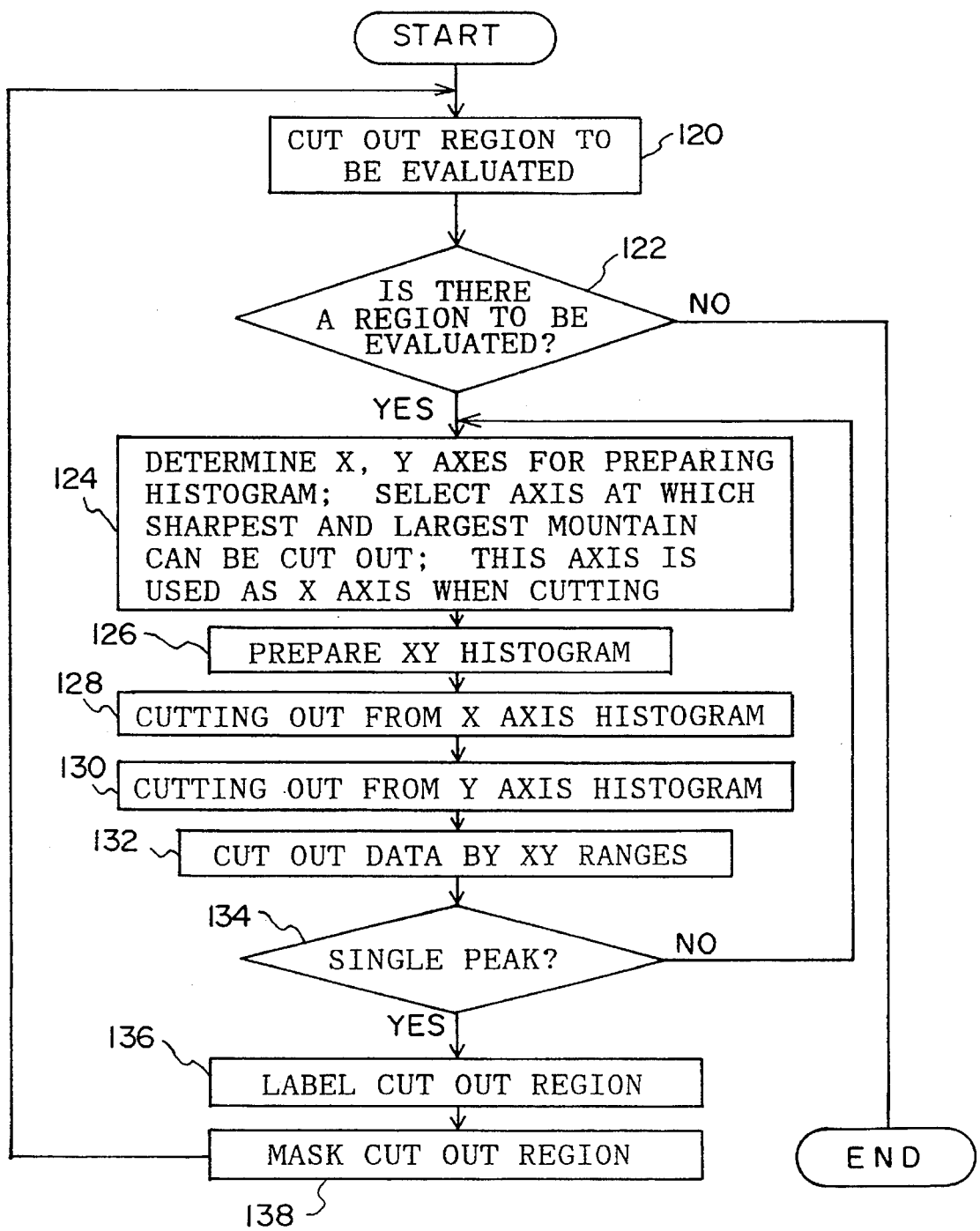
FIG. 5 is a line diagram illustrating details of step in FIG. 2.

Next, steps 106 through 110 will be described in detail. FIG. 5 illustrates step 106 in detail. In step 120, a region which is to be evaluated is cut out from the two-dimensional histogram for hue values and saturation values. In order to simplify the explanation in FIGS. 4A through 4C, a single frame is taken as the region to be evaluated. In step 122, a determination is made as to whether there exists a region to be evaluated. If a region to be evaluated was not cut out in step 120, i.e., when evaluation of all of the regions has been completed, there are no regions to be evaluated, and consequently, the routine is completed. When there exist regions to be evaluated, in step 124, X and Y axes for preparing a histogram to be used for cutting out the mountains are determined. Namely, the region to be evaluated is pivoted around an axis parallel to the number of pixels axis, and positions at which there are the most peaks as seen from the side of the mountains of the histogram are determined, and of the determined positions, a position at which the mountains are the most sharp is determined. This position is used as a reference for determining the X and Y axes. In cases in which it is necessary to shorten the processing time, the axes at which the dispersion of the histogram is a maximum may be used as the X and Y axes, although accuracy will be slightly reduced by use of this method. In the example illustrated in FIG. 4A, when the four mountains numbered 1 through 4 are viewed from the side, the position at which there are the most peaks and at which the mountains are the most sharp is a position at which three mountains can be seen. Therefore, a direction orthogonal to the viewing direction is determined to be the X axis, and a direction orthogonal to the X axis is determined to be the Y axis.

In subsequent step 126, the two-dimensional histogram is projected on the X and Y axes so as to form respective one-dimensional histograms. In the example in FIG. 4A, as seen from a direction orthogonal to the X axis, the mountains numbered 1 and 2 seem to be overlapping. Therefore, three mountains, i.e., the mountain numbered 3, the mountains numbered 1 and 2, and the mountain numbered 4 are expressed in the one-dimensional histogram for the X axis. Because the mountains 1 through 4 overlap when viewed from a direction orthogonal to the Y axis, one mountain is expressed in the one-dimensional histogram for the Y axis. In step 128, the histogram is converted into a performance function H(a) by following formula (6), and cutting out of the mountains from the histogram is effected for the X axis based on this performance function.

$$H(a) = \Sigma \frac{2f(a) - f(a+x) - f(a-x)}{x} \quad (6)$$

wherein f(a) is the number of pixels when the value in the X axis direction (characteristic amount) is a; and x is the displacement from the characteristic amount a.

Namely, an average value T of the performance function H(a) is determined, and a range less than or equal to the average value T of the performance function H(a) (i.e., a range in which a valley or the foot of a mountain exists) is determined. Next, the position in this range at which the histogram is at a minimum is taken as the valley or the foot of the histogram. The histogram is cut out at the determined valley or foot.

Figure 6:
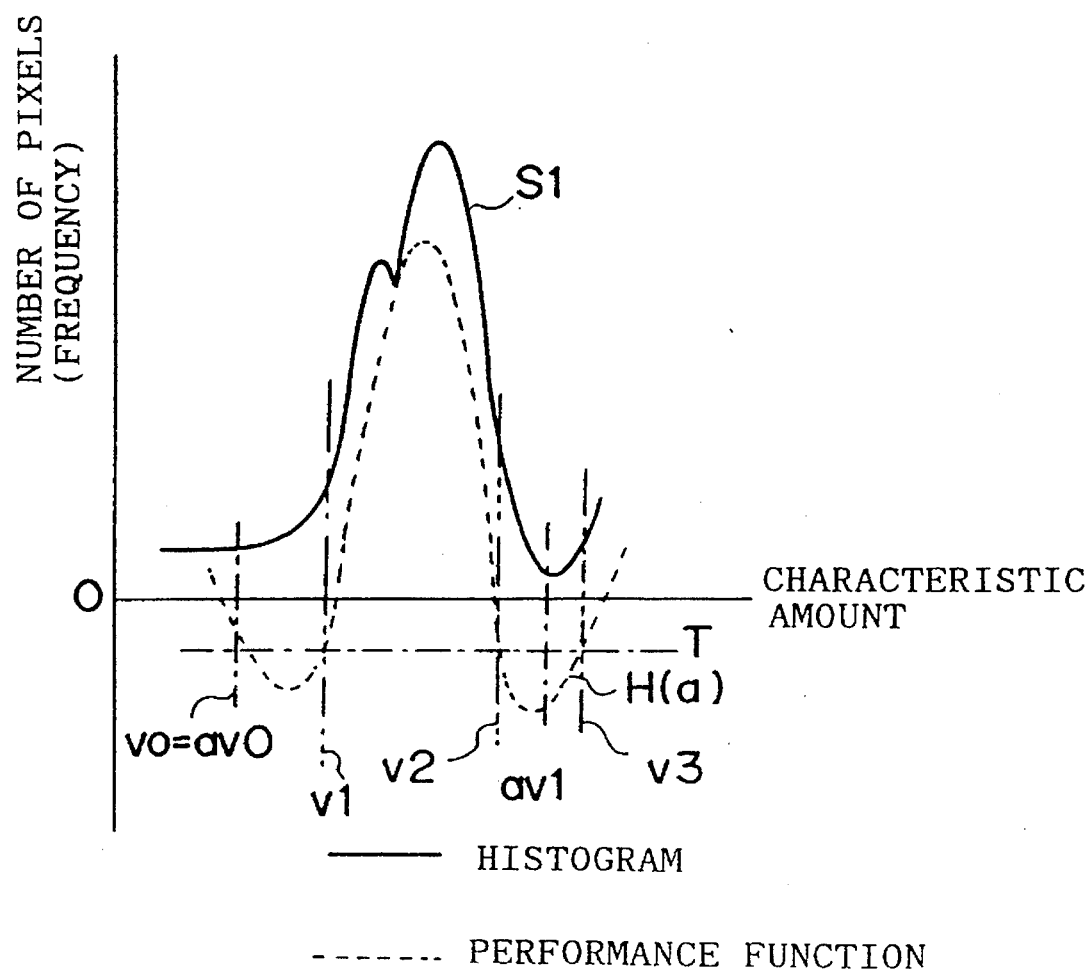
FIG. 6 is a line diagram illustrating a histogram and a performance function.

The cutting out of the mountain will be explained with reference to FIG. 6. When the performance function H(a) is determined from the histogram represented by the solid line S1, H(a) is expressed by the broken line in the figure. The ranges less than or equal to the average value T with respect to the negative portions of the performance function H(a) are ranges in which the characteristic amount is v0 to v1 and v2 to v3. Positions within these ranges at which the frequency of the histogram is at a minimum are av0=v0 in the range v0 to v1, and av1 in the range v2 to v3. av0 and av1 are determined as a foot portion and a valley, respectively, and the histogram is cut out at these positions.

In step 130, the mountains of the histogram for the Y axis are cut out by the same method used to cut out the mountains of the histogram for the X axis. In subsequent step 132, a region in which the mountains of the one-dimensional histograms for the X axis and the Y axis, which were cut out on the two-dimensional axis as described above, overlap is determined. Cutting out of the mountains from the two-dimensional histogram with respect to hue values and saturation values is effected. Region E1 in FIG. 4A is an example of a mountain cut out as described above.

In step 134, a determination is made as to whether the mountain cut out from the two-dimensional histogram has a single peak. If there is no single peak, steps 124 through 134 are repeated until the mountain cut out from the two-dimensional histogram has a single peak. Region E2 in FIG. 4C is an example of a single-peak mountain cut out in the above-described manner.

In step 136, a process for attaching a label in order to identify the single-peak mountain which was cut out is effected (labeling). In step 138, the labeled mountain is masked, and the process returns to step 120. The above-described steps are repeated so that all of the regions of the two-dimensional histogram for hue values and saturation values are divided into single-peak mountains.

Figure 7:
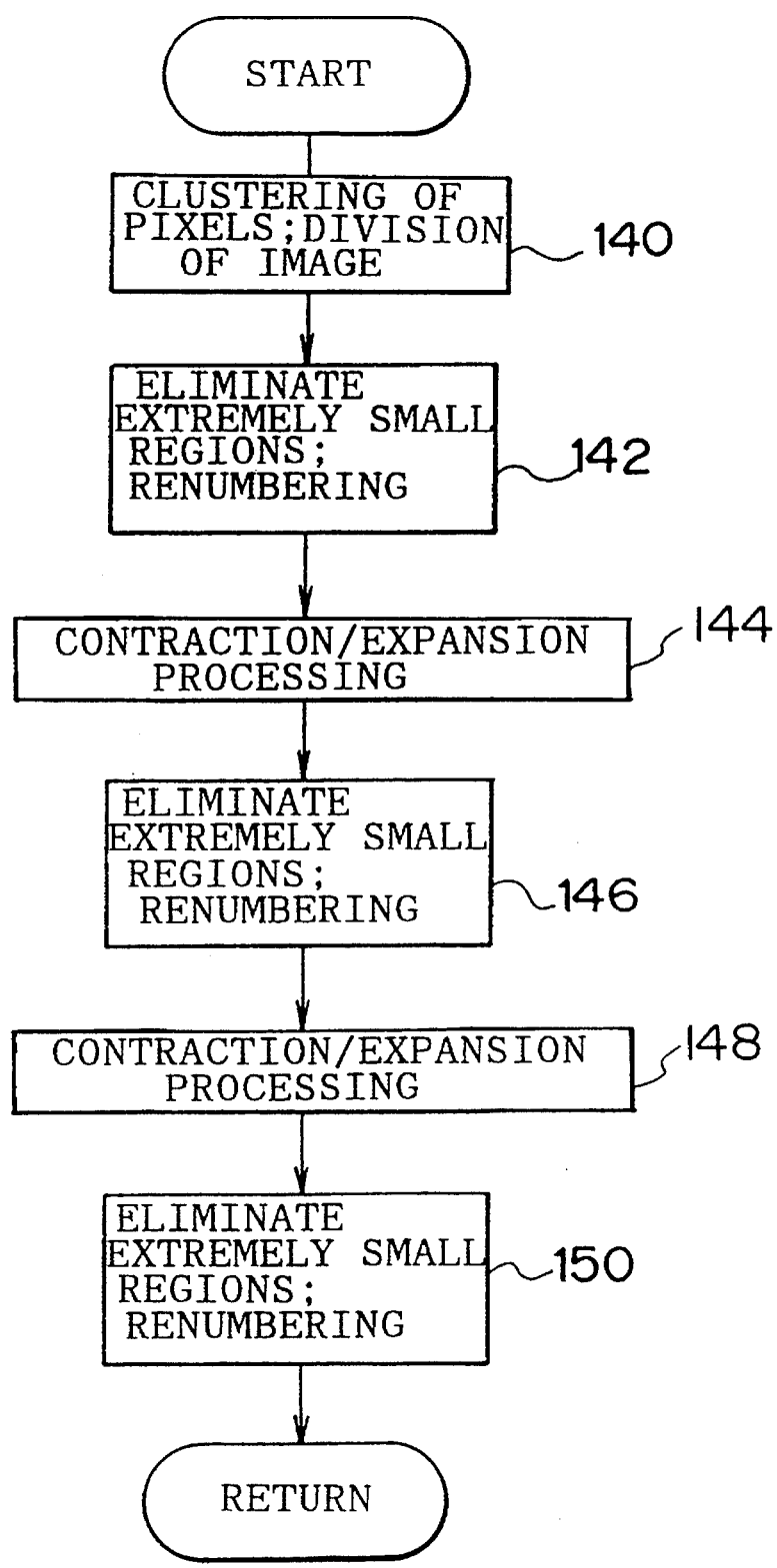
FIG. 7 is a line diagram illustrating details of step 108 in FIG. 2.

FIG. 7 illustrates details of step 108 in FIG. 2. In step 140, a range XR (see FIG. 4C) in the X axis direction and a range YR (see FIG. 4C) in the Y axis direction of the single-peak mountains which were divided in the above manner are respectively determined for each single-peak mountain. For each pixel of the original image, a determination is made as to whether the hue value and the saturation value belong in these ranges, and clustering of the pixels is effected. Further, pixels belonging in a range enclosed by the ranges XR, YR are collected, and the original image is divided so that the collected pixels are in a single region on the original image. The divided regions are numbered. FIG. 4B illustrates an example of dividing the original image. The pixels of the respective regions numbered 1 through 4 correspond to the pixels included in the single-peak mountains numbered 1 through 4. The pixels belonging to the same single-peak mountain in FIG. 4A are divided into different regions in FIG. 4B. In FIG. 4A, there are pixels having the hue value range and the saturation value range of the single-peak mountain, and in FIG. 4B, the regions are divided.

In step 142, extremely small regions are eliminated by determining the surface areas of the divided regions, and the regions are then renumbered. In step 144, a contracting process, in which all of the boundary pixels of a region are eliminated, and all expanding process, in which, in a manner opposite to the contracting process, the boundary pixels are increased in the direction of the background pixels, are effected. Small regions, which have merged with large regions, are thereby separated from the large regions. In step 146, extremely small regions are eliminated and the regions are renumbered in the same way as in step 142. In step 148, the contracting and expanding processes are carried out as described above in order to separate regions which are weakly linked together. In step 150, removal of the extremely small regions and tenumbering are effected in the same way as described above.

Figure 8:
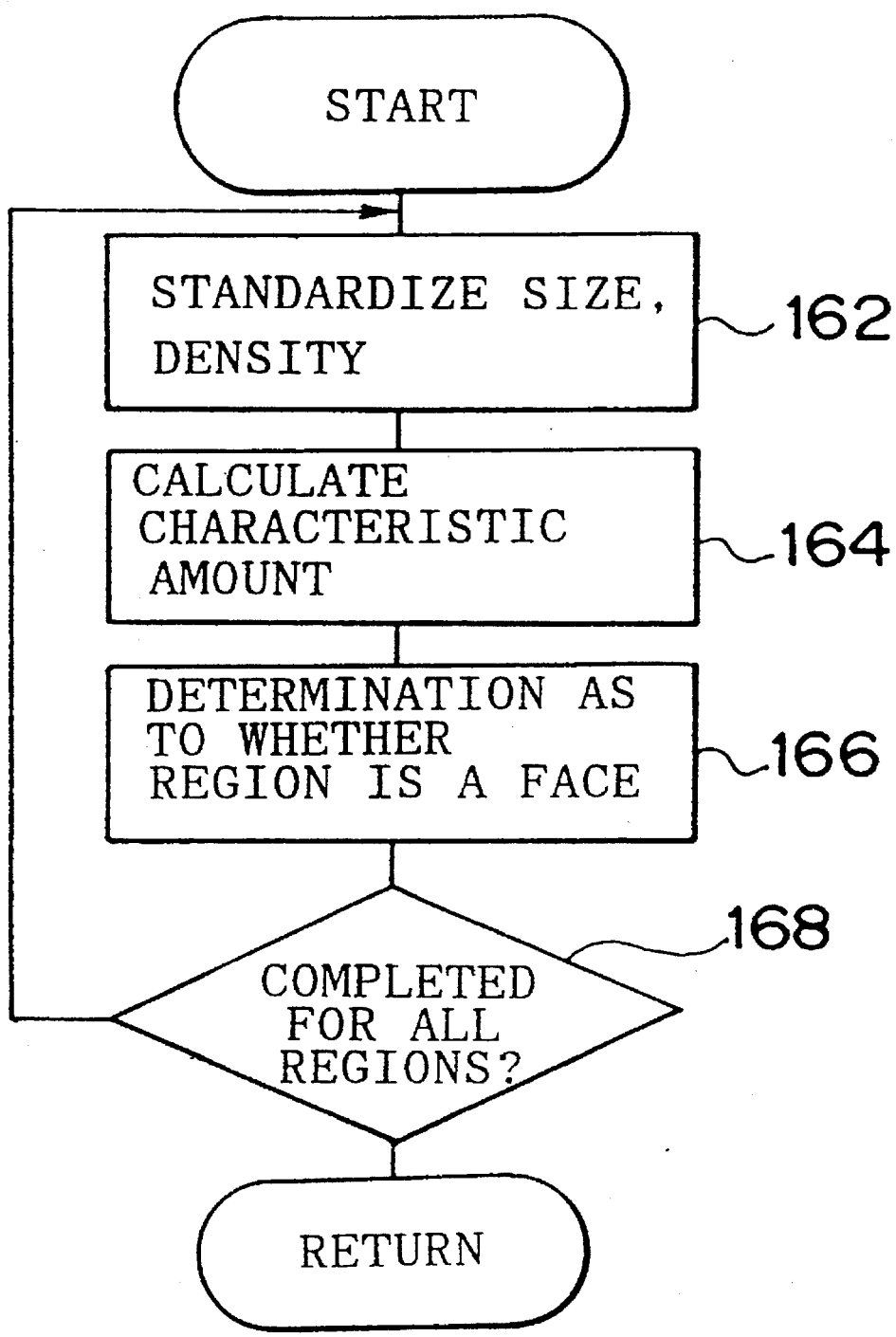
FIG. 8 is a line diagram illustrating details of step in FIG. 2.

FIG. 8 illustrates the details of step 110. In step 162, one region among the regions extracted in step 108, i.e., in the routine of FIG. 7, is selected as a region of notice. Enlargement/reduction processing of the region of notice is effected and the size of the region of notice is standardized so that the horizontal fillet diameter and the vertical fillet diameter of the region of notice become predetermined values. Further, the density value or the luminance value is standardized in accordance with following formula (7).

$$d_r = \frac{d_s}{d_{max} - d_{min}} \cdot (d - d_{min}) \quad (7)$$

wherein $d_{max}$: maximum density value (or luminance value) within region $d_{min}$: minimum density value (or luminance value) within region $d_s$: full scale density value (or luminance value) of image sensor d: density value (or luminance value) before standardization $d_r$: density value (or luminance value) after standardization In step 164, a correlation coefficient r of the region of notice with respect to a plurality of types (10 types in the present embodiment) of standard face images determined in advance (a face image as viewed from the front, face images as viewed from the sides (left and right), a downward-turned face image, and upward-turned face image and the like) is calculated in accordance with following formula (8). It suffices that the standard face image is only data of an outline of a face. Alternatively, the standard face image may be data in which data regarding the structure of the inner portion of the face (eyes, nose, mouth, and the like) is added to the data of the outline of the face.

$$r = \frac{\sigma_{fg}}{\sigma_f \sigma_g} \quad (8)$$

wherein $$\sigma_{fg} = \frac{1}{T^2} \sum_x \sum_y f(x,y)g(x,y) - \quad (9)$$

$$\frac{1}{T^2} \sum_x \sum_y f(x,y) \cdot \frac{1}{T^2} \sum_x \sum_y g(x,y)$$

$$\sigma_f = \left\{ \frac{1}{T^2} \sum_x \sum_y (f(x,y))^2 - \frac{1}{T^2} \sum_x \sum_y (f(x,y))^2 \right\}^{1/2}$$

$$\sigma_g = \left\{ \frac{1}{T^2} \sum_x \sum_y (g(x,y))^2 - \frac{1}{T^2} \sum_x \sum_y (g(x,y))^2 \right\}^{1/2}$$

wherein
and T is the length of the horizontal and vertical fillet diameter of the image (here, the lengths of the fillet diameters are the same); f(x,y) is the region of notice; and g(x,y) represents the standard face image.

In step 166, a determination is made as to whether the region of notice is a human face by linear discrimination analysis in which the characteristic amount is a variable. R, G, B photometric data of a region determined to be a face is output to the appropriate exposure amount calculating circuit 40. In step 168, a determination is made as to whether determinations of whether a region is a face have been completed for all of the extracted regions. If the determinations have not been completed, steps 162 through 168 are repeated.

In the above explanation, the correlation coefficient is used as the characteristic amount which is used for determining whether a region is a human face. However, an invariant, an autocorrelation function or a geometrical invariant derived from a central moment which is normalized around a center of gravity, as will be explained later, may be used.

If a (p+q) order central moment $\mu_{pq}$ of the image f(x,y) around the center of gravity is expressed as:

$$\mu_{pq} = x\Sigma\, y\Sigma\, (x - \bar{x})^p (y - \bar{y})^q f(x,y) \quad (10)$$

wherein $$\bar{x} = \frac{m_{10}}{m_{00}} \quad (11)$$

$$\bar{y} = \frac{m_{01}}{m_{00}}$$

$$m_{pq} = x\Sigma\, y\Sigma\, x^p y^q f(x,y)$$

$$(p,q = 0, 1, 2 \ldots)$$

then the normalized central moment around the center of gravity is as follows.
wherein y=(p+q+2)/2
p+q=2, 3, . . .

From the above, the following seven invariants $\phi_i$ (i= 1, 2, . . . 7) can be derived from second order and third order normalized central moments around the center of gravity. t,340

Further, an autocorrelation function $R_f$ is expressed as follows.

$$R_f = x\Sigma\, y\Sigma\, f(x,y)f(x + s, y + t) \quad (14)$$

A geometrical invariate characteristic amount is expressed by the following formula.

$$X_f = x\Sigma\, y\Sigma\, f(x,y)f(x + s, y + t)f(x + u, g + u) \quad (15)$$

Figure 9:
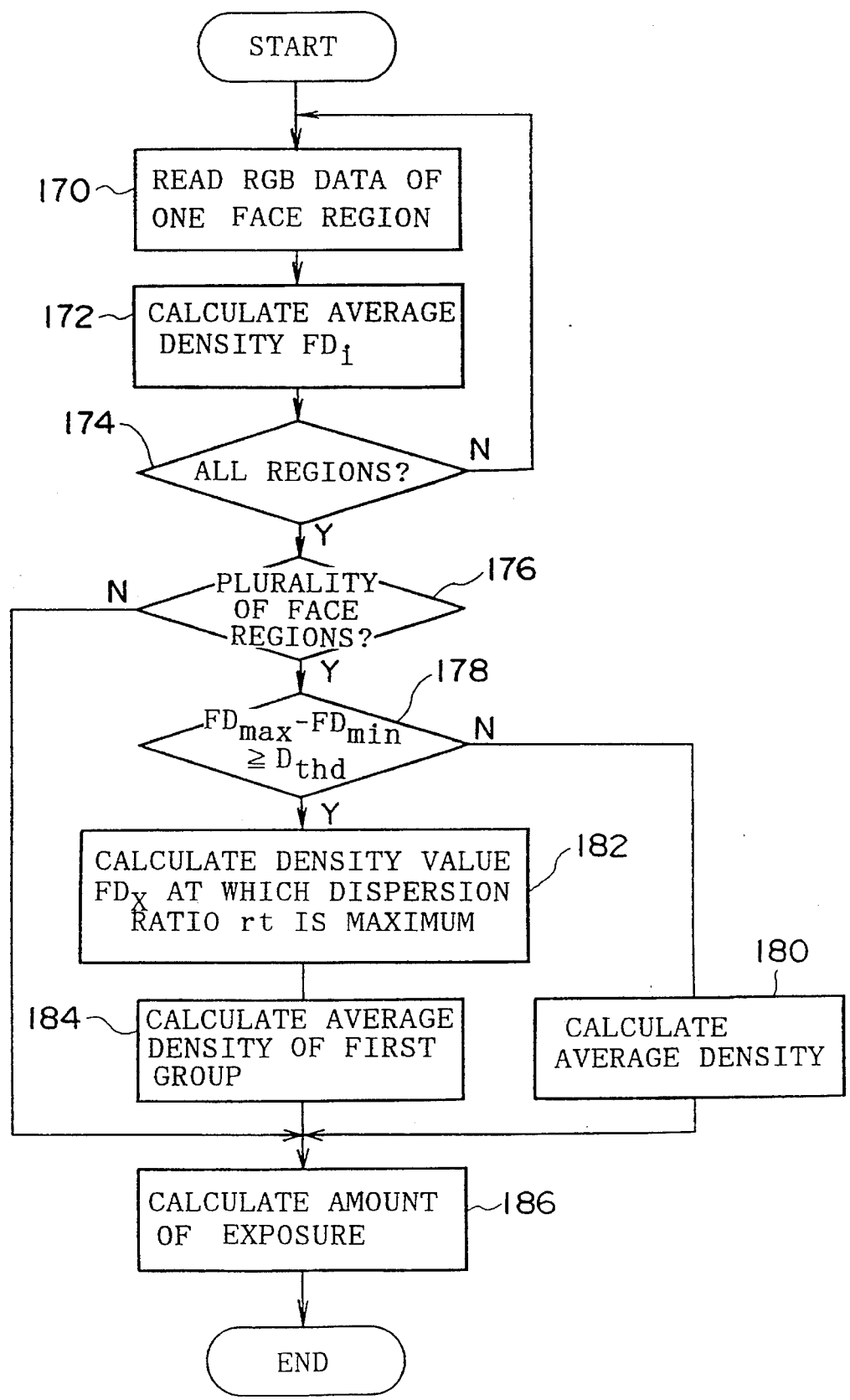
FIG. 9 is a flow diagram illustrating an appropriate exposure amount calculating routine of an appropriate exposure amount calculating circuit.

FIG. 9 illustrates an appropriate exposure amount calculating routine of the appropriate exposure amount calculating circuit 40. In step 170, R, G. B three color photometric data of a single face region, which was extracted in the face extraction circuit 36 as described above, is read. In step 172, an average density (hereinafter, "average face density") $FD_i$ of the read face region is calculated on the basis of following formula (16). The results of this calculation are stored in an unillustrated memory. In step 174, a determination is made as to whether all of the face regions have been read from the image frame. If there are any face regions remaining, steps 170 and 172 are repeated. When the reading of all of the face regions has been completed, the process proceeds to step 176 where a determination is made as to whether there is a plurality of extracted face regions. If the determination is negative, i.e., if there is only one extracted region, the process proceeds to step 186.

$$FD_i = (FD_{iR} + FD_{iG} + FD_{iB})/3 \quad (16)$$

wherein i=1 . . . n (the number of face regions)

$FD_{iR}$, $FD_{iG}$, $FD_{iB}$: respective average densities of the three colors R, G, B at region i.

When there exists a plurality of extracted face regions, the answer to the determination in step 176 is "Yes", and in step 178, the maximum density $FD_{max}$ and the minimum density $FD_{min}$ of the average face density $FD_i$ of each face region are determined, and a determination is made as to whether the difference therebetween ($FD_{max}-FD_{min}$) is greater than or equal to a predetermined value $D_{thd}$. If a determination is made that the difference is less than the predetermined value, the dispersion of the face density is small. Therefore, in step 180, the average of a plurality of average face densities is determined, and the determined average density is used as the image frame face region average density FD, and the process proceeds to step 186. In step 180, a single average face density may be selected and outputted rather than calculating the average of a plurality of average face densities.

Figure 10:
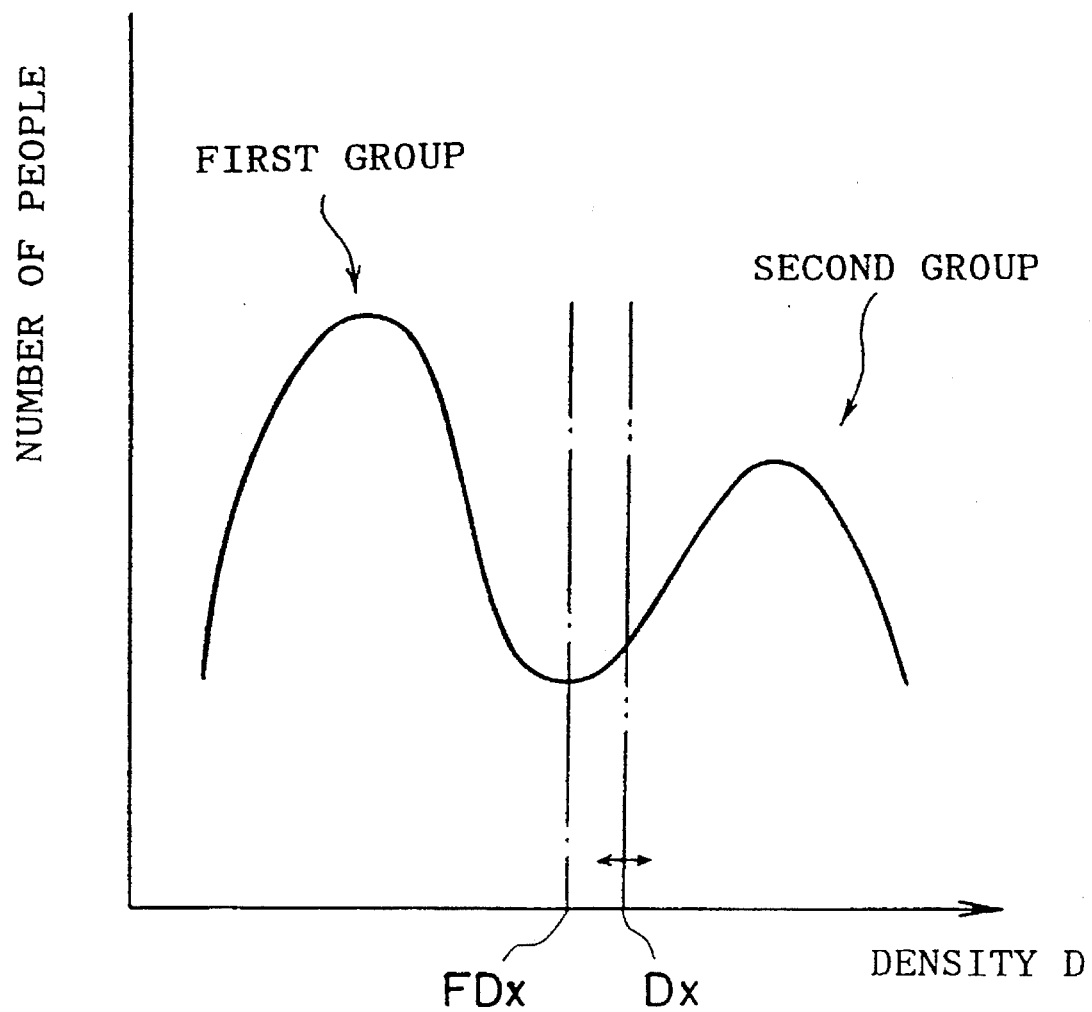
FIG. 10 is a line diagram illustrating a histogram for density values and numbers of people.

On the other hand, when the difference between the maximum density $FD_{max}$ and the minimum density $FD_{min}$ is greater than or equal to the predetermined value $D_{thd}$, the process proceeds to step 182. In step 182, the extracted face regions are classified into two groups based on the average face densities, and a density value $FD_X$ of a divided area at which a ratio rt is a maximum is determined. The ratio rt (hereinafter, "dispersion ratio") is the ratio of the dispersion $\sigma_A$ between the classified groups (hereinafter, "inter-group dispersion") to the dispersion $\sigma_B$ of the average face densities within the respective groups (hereinafter, "intra-group dispersion"). Namely, as illustrated in FIG. 10, a histogram of density values and the number of people for which one extracted face region was taken as one person is determined by using a coordinate system formed from a density value axis and a number of persons axis which are orthogonal to each other. In this histogram, a density value $D_X$ determined in advance is used as a density classification reference value, and the histogram is classified into a first group which includes Face regions in which the average face density $FD_i$ is less than the density value $D_X$, and a second group which includes face regions in which the average face density $FD_i$ is greater than or equal to the density value $D_X$. The dispersion ratio rt for these classified groups is determined on the basis of following formula (17). Next, the density values $D_X$ are successively increased or decreased, and the value of the density value $D_X$ at which the dispersion ratio rt is a maximum is calculated. The calculated value $D_X$ is taken as the density value $FD_X$ of the divided area. When the distribution ratio rt is at a maximum, the optimal density value $FD_X$ can be selected so that the mountains on the histogram in FIG. 10 are divided by using the density value $FD_X$ as a boundary such that each mountain has a single peak.

$$rt = \sigma_A^2 / \sigma_B^2 \qquad (17)$$

Here, the inter-group dispersion $\sigma_A$ and the intra-group dispersion $\sigma_B$ can be determined by following formula (18).

$$\sigma_A = \{n_1(FD_1m - FD_m)^2 + n_2(FD_2m - FD_m)^2\}/n$$

and $$\sigma_B = \sigma_T^2 - \sigma_A^2 \qquad (18)$$

wherein np: the number of people ($n_1$, $n_2$) included in the pth group $FD_{pm}$: the average density values ($FD_{1m}$, $FD_{2m}$) of the face regions included in the pth group $FD_m$: the average density value of all of the extracted face regions n: the number of extracted face regions $\sigma_T$: entire dispersion Further, the entire dispersion can be determined from following formula (19).

$$\sigma_T = \Sigma\Sigma(FD_{pk} - FD_m)^2/n \qquad (19)$$

wherein $FD_{pk}$: the average face density of the kth face region of the pth group.

In subsequent step 184, the average density value $FD_{1m}$ of the average face densities included in the first group is calculated as the face region average density FD of the image frame, and the process proceeds to step 186. The average density value $FD_{1m}$ of the first group is used as the face region average density FD so that exposure amount correction, which will be described later is effected only for races susceptible to color variation of the face region. Namely, as opposed to a ease in which the reflectance of the face is high, even if some brightness occurs in the obtained image in a ease in which the reflectance of the face is low, there is little effect because the density of the face region is high. Accordingly, by dividing the densities of the plurality of face regions included in the original image into two groups as described above, the face regions are classified into a first group in which the reflectances of the faces are high and a second group in which the reflectances of the faces are low. By selecting the first group, correction can be effected based on an outputted density value from which the densities of the face regions having low reflectances are excluded.

In step 186, by using the average face density FD determined as described above and the image average density $D_i$ (wherein i is any one of R, G, B) of one frame which is calculated in the average density calculating circuit 38, the appropriate exposure amount $E_i$ is calculated in accordance with the following formula so that the average face density becomes a standard density, and the appropriate exposure amount $E_i$ is output to the driver 42. The driver 42 calculates all exposure control value from the appropriate exposure amount $E_i$ so as to control the light-adjusting filter 16.

$$\log E_i = LM_i \cdot CS_i \cdot (DN_i - D_i) + PB_i + LB_i + MB_i NB_i K_1 + K_2 \qquad (20)$$

wherein the respective notations represent the following.

LM: Magnification slope coefficient. Set in advance in accordance with the enlargement ratio determined from the type of the negative and the print size.

CS: Color slope coefficient prepared for each type of negative, including underexposed and overexposed negatives. It is determined that the average density of a frame to be printed is either under or over a standard negative density value, and the color slope coefficient for either underexposure or for overexposure is selected.

DN: Standard negative density value.

D: Average density value of print frame.

PB: Correction balance value for standard color paper. Determined in accordance with the type of color paper.

LB: Correction lens balance value for standard printing lens. Determined in accordance with type of printing lens.

MB: Correction value (master balance value) for fluctuations in printing light source and variations in the paper developing capability.

NB: Negative balance (color balance) value determined by characteristic of negative film.

$K_2$: Color correction amount.

$K_1$: Density correction amount expressed by the following formula.

$$K_a \left( \frac{D_R + D_G + D_B}{3} - \frac{FD_R + FD_G + FD_B}{3} \right) + K_b \qquad (21)$$

Here, $K_a$ and $K_b$ are constants, and FD is the face region average density calculated above.

Further, a correction value determined by a film testing device may be used as the density correction amount $K_1$ in above formula (20), and the color correction amount $K_2$ may be expressed by using the face reglon average density as follows.

$$(K_2)_i = K_c \left\{ \left( FD_i - \frac{FD_R + FD_G + FD_B}{3} \right) - \right. \qquad (22)$$

$$\left( DN_i - \frac{DN_R + DN_B + DN_G}{2} \right) \right\}$$

wherein $K_c$ is a constant.

Moreover, correction amounts determined by a film testing device may be used as the density correction amount $K_1$ and the color correction amount $K_2$ of formula (20), and the average density $D_i$ of the print frame in formula (20) may be substituted by the average density $FD_i$ of the face region so as to determine the exposure amount.

In the present embodiment, judgment is effected by using the outline of the region and the structure of the inner portion thereof. Therefore, face data can even be extracted from an image in which there exist faces, ground, trees and the like having similar hues.

Further, in the present embodiment, from the extracted face region data, the densities of the plurality of face regions included within the original image are classified into the first group of faces with high reflectances and the second group of faces with low reflectances, and correction of the exposure amount is effected in accordance with the face density of the first group in which faces have high reflectances. Therefore, even if there exists a plurality of face regions of different races within the original image, the exposure amount can be determined so that the respective face densities become appropriate densities without being effected by the face densities of the faces having low reflectances.

Moreover, although the present embodiment was explained by using a case in which densities are photometrically measured from an image of a negative film, a reversal film may be used.

Figure 11:
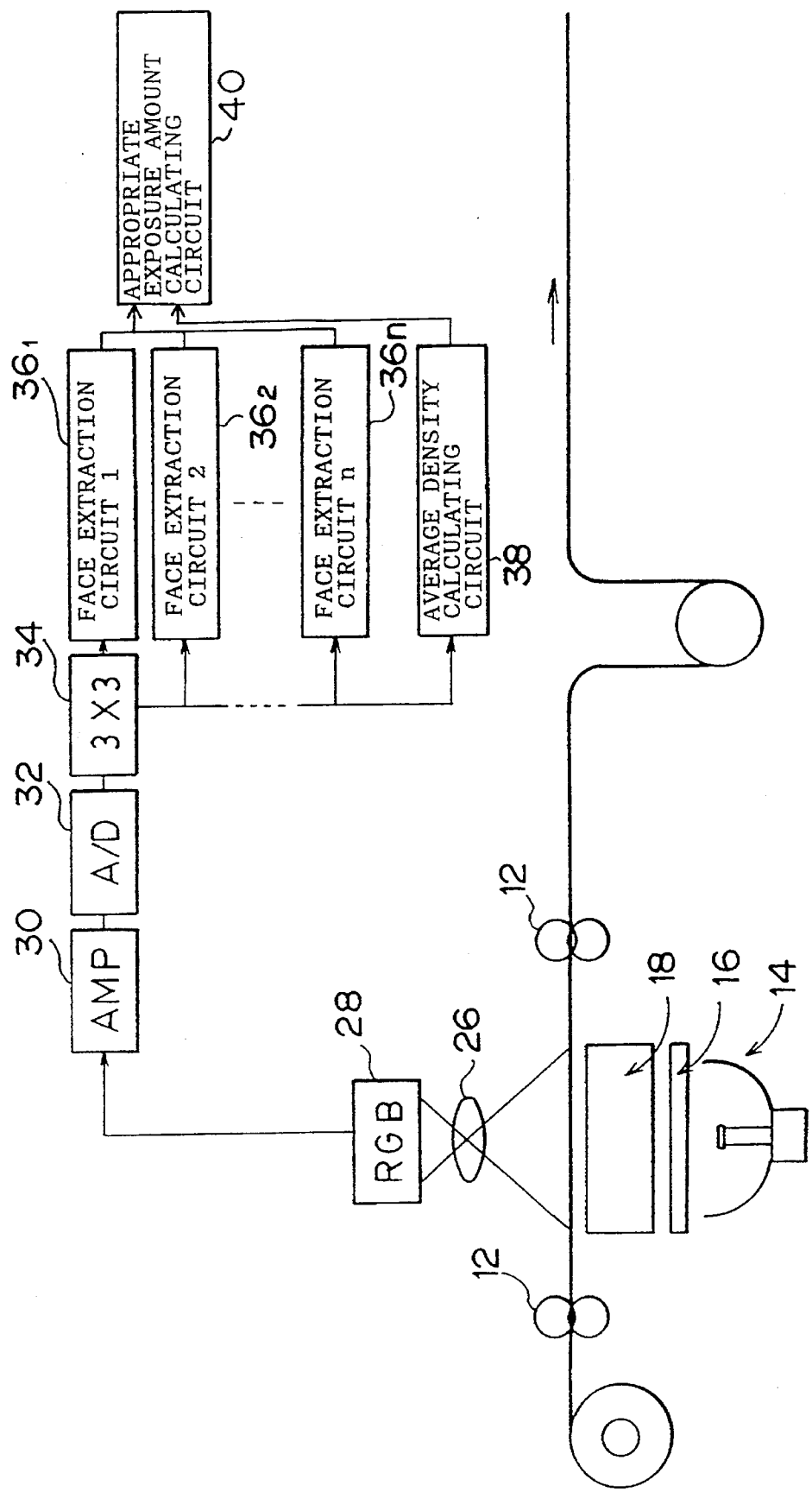
FIG. 11 is a schematic view of an exposure amount calculating device to which the present invention is applied.

FIG. 11 illustrates a variation in which the present invention is applied to an exposure amount determining device which is provided separately from a printer or a printer processor. Portions of FIG. 11 which correspond to portions of FIG. 1 are denoted by the same reference numerals, and description thereof is omitted. Further, it is not always necessary to use the average density calculating circuit 38, and instead, an integrated transmission density detecting circuit which detects the LATD of the entire image may be used.

Figure 12:
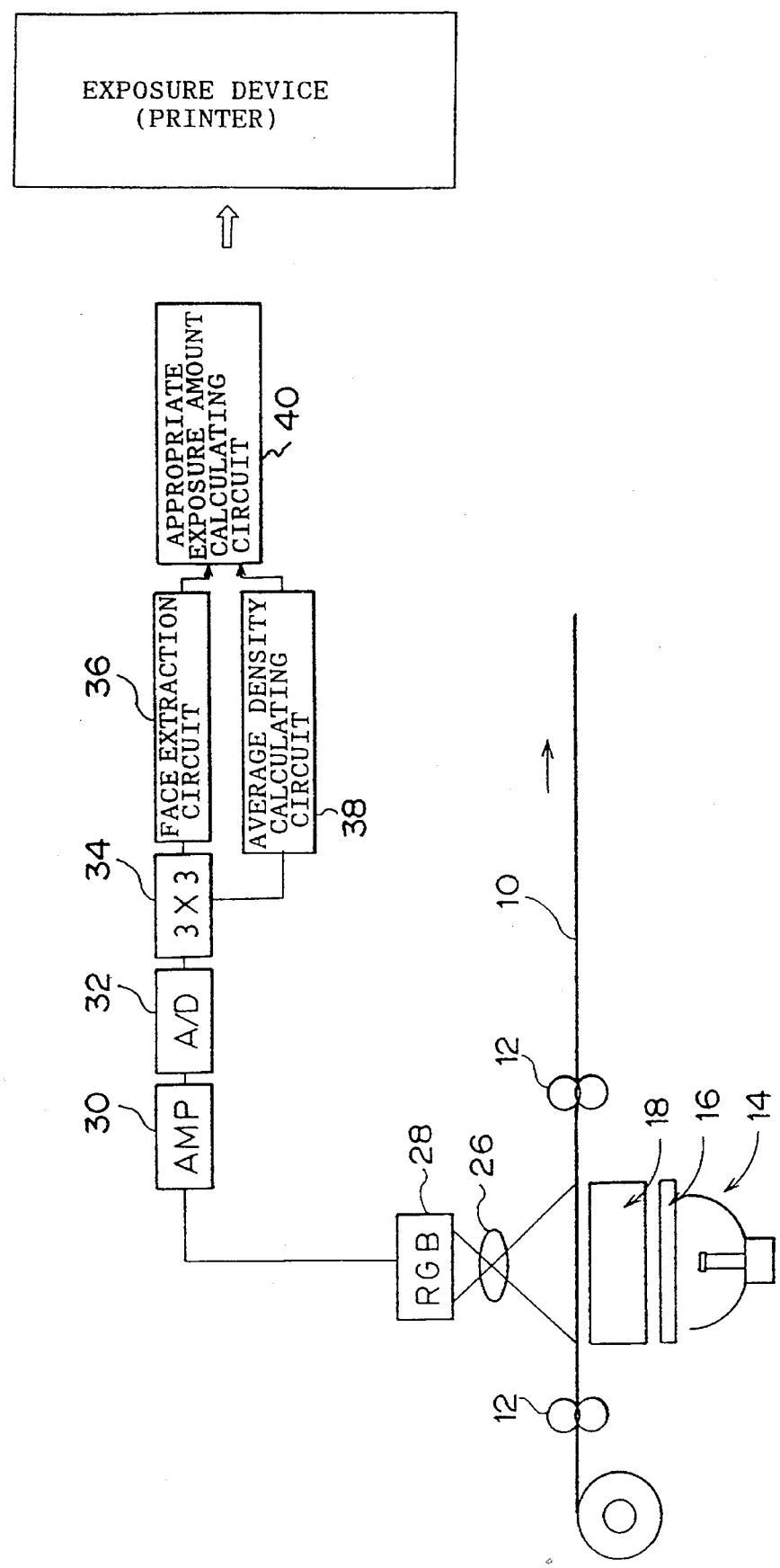
FIG. 12 is a schematic view of an exposure amount calculating device which effects parallel processing by a plurality of face extraction circuits.
Figure 13:
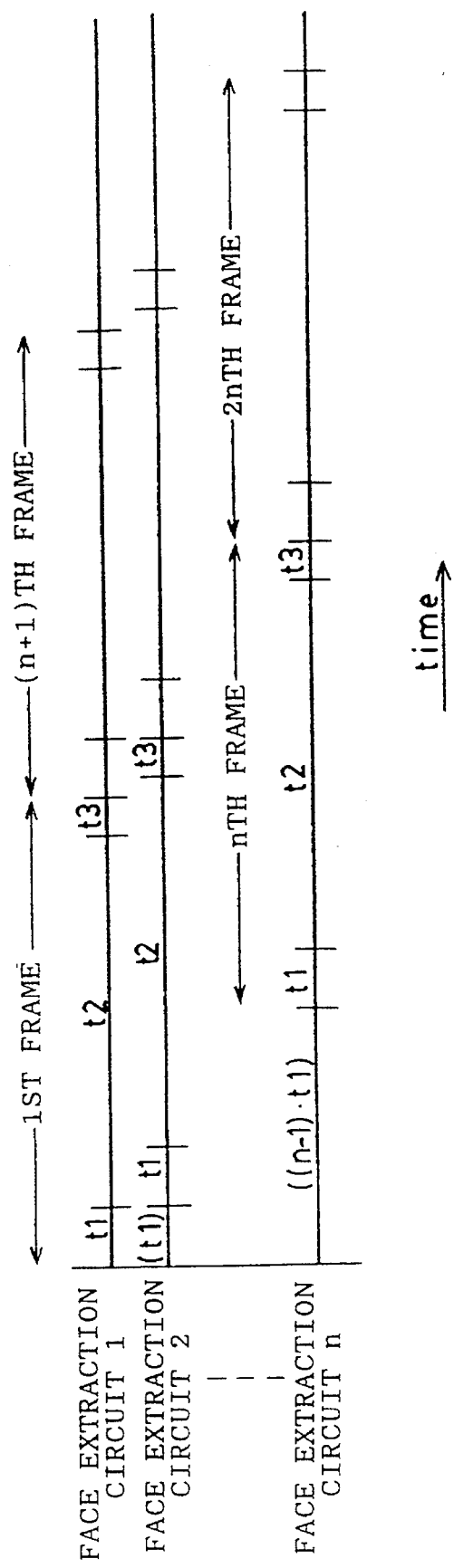
FIG. 13 is a line diagram illustrating a time chart of parallel processing.
Figure 14:
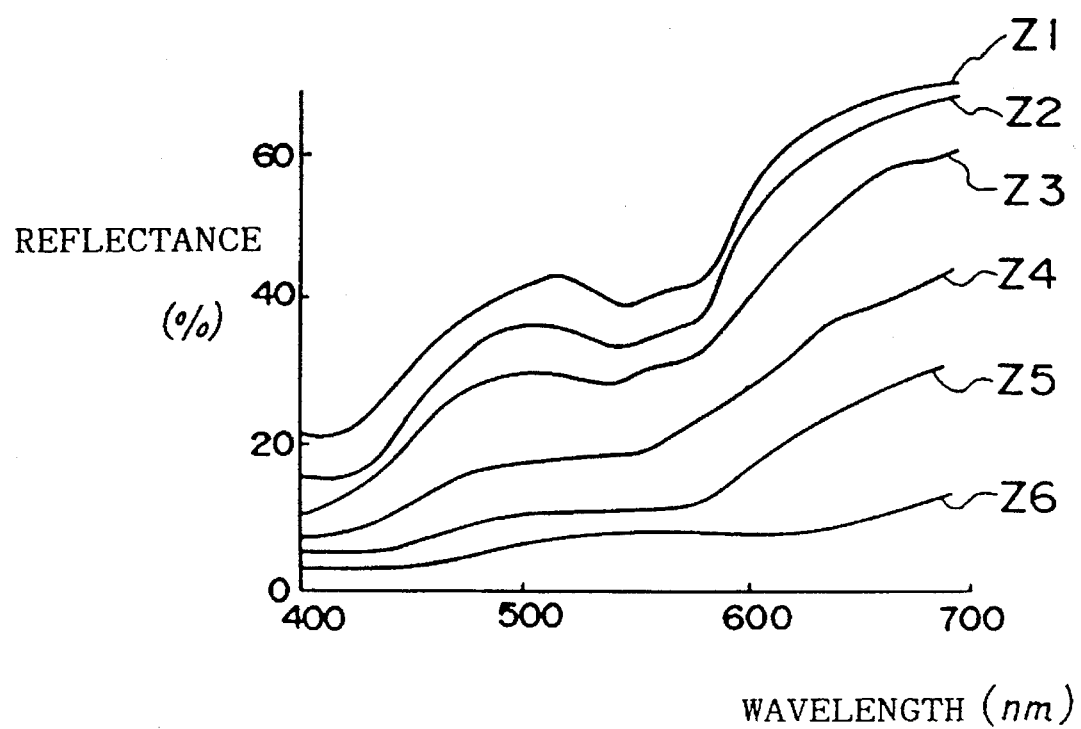
FIG. 14 is a line diagram illustrating spectral reflectance characteristics of skins of different races.

In FIG. 12, the face extracting circuit of FIG. 11 is formed of a plurality of face extracting circuits $36_1, 36_2 \ldots 36_n$ so that the exposure amount is calculated by parallel processing. The face extracting circuits $36_1, 36_2 \ldots 36_n$ read the image in accordance with the time chart in FIG. 13, calculate the exposure amount, and output the results. In FIG. 13, $t_1$ is the time for reading the image of one frame, $t_2$ is the time for calculating the exposure amount of one frame, $t_3$ is the time for transmitting the results of calculation of the exposure amount of one frame, and $t_2 \gg t_1, t_3$. The face extraction circuit $36_1$ reads the image of one frame in $t_1$, calculates the amount of exposure in $t_2$, and transmits the results of calculation in $t_3$. At the same time that the reading of the image of one frame by the face extraction circuit $36_1$ is completed, the film is advanced one frame, and the reading of the image of one frame by the face extraction circuit $36_2$ begins. The calculation of the exposure amount by the face extraction circuit $36_1$ and the reading of the image by the face extraction circuit $36_2$ are effected in parallel. Thereinafter, parallel processing is effected in a similar manner by the Face extraction circuits $36_3, 36_4 \ldots 36_n$.

The time $T_p$ necessary for the parallel processing of m×n Frames is $$T_p = m(t_1+t_2+t_3)+(n-1)t_1.$$

On the other hand, the processing time $T_s$ when parallel processing is not effected is $$T_s = m \cdot n(t_1+t_2+t_3).$$

Accordingly, it is possible to effect processing $T_s/T_p$ times faster, $T_s/T_p$ being as follows.

$$T_S/T_P = \frac{m \cdot n(t_1 + t_2 + t_3)}{m(t_1 + t_2 + t_3) + (n - 1)t_1} \quad (23)$$

This parallel processing device can also be used with the printer in FIG. 1.

Other than the determination of the amount of exposure for a photographic printing device, the present invention can also be used to determine the amount of exposure of a digital color printer, to determine copy conditions of a copier, to determine the amount of exposure of a camera, to determine the display conditions of a CRT image, and to determine the amount of light when a hard copy is prepared from magnetic image data.

A second embodiment of the present invention will now be described. The second embodiment is structured basically the same as the first embodiment. Parts and steps of the second embodiment which are the same as those of the first embodiment will be denoted by the same reference numerals, and description thereof will be omitted.

In step 166, R, G, B photometric data of regions are output to the appropriate exposure amount calculating circuit 40 even for regions which are judged not to be faces. In this case, in order to distinguish the photometric data of the regions which are judged not to be faces from the R, G, B photometric data of the regions which are judged to be faces, when it is determined that the region is a face, a set face flag is output simultaneously with the determination, and when it is determined that the region is not a face, a reset face flag is output simultaneously with the determination.

A correction coefficient is used as the characteristic amount for determining whether a region is a human face. However, in the same way as in the first embodiment, an invariant, an autocorrelation function or a geometrical invariant derived from a central moment which is normalized around a center of gravity may be used.

When the reflectance of the face of a photographed subject is low compared with a standard reflectance, the density of the face on the negative film becomes low. An extremely low reflectance of the face of the photographed subject may signify one of the following. 1) If the subject was photographed by rear light, the exposure is extremely insufficient. Even if correction for the rear light is purposely effected, it will become difficult to see the background and the appropriate density will not be reproduced. Therefore, there is no need to effect correction by using the face density. 2) In cases of appropriate exposure, overexposure, and underexposure, there is no need to effect density correction by using the face density. 3) In a case of electronic flash exposure, there are seldom cases in which it becomes difficult to see the face. Therefore, even if correction by using the face density is not effected, no drawback arises.

Accordingly, when the reflectance of the face of the photographed subject is extremely low, there is no need to effect correction by using the density of the face region. Further, when it is necessary to correct an image which has been photographed by rear light, it is determined whether the image is an image which has been photographed by rear light or whether the reflectance of the face of the photographed subject is low. Only in cases in which it is determined that the reflectance of the face of the photographed subject is low is it preferable to not effect exposure by using the face density.

Figure 15:
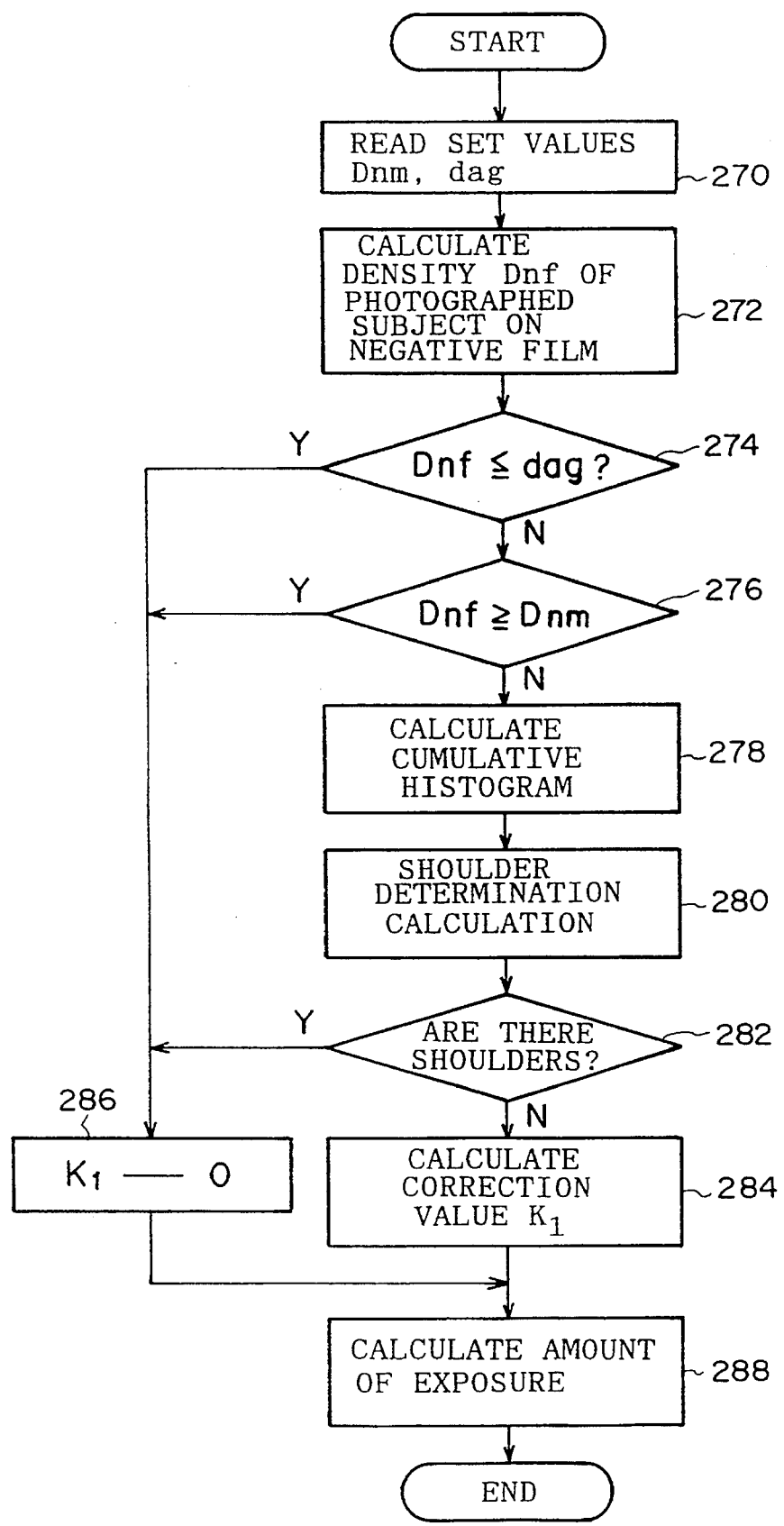
FIG. 15 is a flow diagram illustrating an appropriate exposure amount calculating routine of an appropriate exposure amount calculating circuit.

FIG. 15 illustrates an appropriate exposure amount calculating routine of the appropriate exposure amount calculating circuit 40 with respect to determining whether correction is to be effected by using the face density as described above. In step 270, set values Dnm, dag which are used in the main routine are read. The set value Dnm represents a density value of a target face density on the negative film. The set value dag represents the density value of a rear light correction determination density, which is a reference value for determining whether an image photographed under rear light is to be corrected. In step 272, the R, G, B three color photometric data of the face region extracted at the face extraction circuit 36 as described above (i.e., the data inputted when the face flag is set) is read, and a photographed subject density Dnf of the face region on the negative film is calculated from the photometric data.

When calculation of the photographed subject density Dnf is completed, the process proceeds to step 274 where a determination is made as to whether Dnf≦dag. When the answer to the determination is "Yes", a correction value $K_1$ to be described later is set to 0, and the main routine is completed. The condition Dnf≦dag signifies either that there is a case in which there is appropriate exposure, rear light, or overall underexposure when the reflectance of the face of the photographed subject is substantially low, or that there is a case in which there is strong rear light when the reflectance of the face of the photographed subject is standard. Accordingly, in these cases, there is no need to effect correction by using the face density.

When the answer to the determination in step 274 is "No", the process proceeds to step 276 where a determination is made as to whether Dnf≧Dnm. If the answer to the determination in step 276 is "Yes", there is no need to effect correction by using the face density because the face density of the photographed subject is the same or greater than the target face density. The correction amount $K_1$ is set to 0, and the main routine is completed.

When the answer to the determination in step 276 is "No", dag<Dnf<Dnm. This condition includes a case in which there is electronic flash exposure or overall overexposure when the reflectance of the face of the photographed subject is substantially low, and a case in which there is weak rear light or overall underexposure when the reflectance of the face of the photographed subject is standard. In the case in which there is electronic flash exposure or overall overexposure when the reflectance of the face of the photographed subject is substantially low, there is no need to effect correction by using the face density. In the case in which there is weak rear light or overall underexposure when the reflectance of the face of the photographed subject is standard, correction by the face density is necessary. The inventors of the present invention noted that two stepped variations (so-called "shoulders") exist in the characteristic of a cumulative histogram of an original image which has been subject to electronic flash exposure. In the present embodiment, a determination is made as to whether this condition is to be corrected by the distribution of the histogram which will be described hereinafter. It is not necessary to use a cumulative histogram; a determination may be made from a density histogram as to whether a mountain has a single peak.

Figure 16:
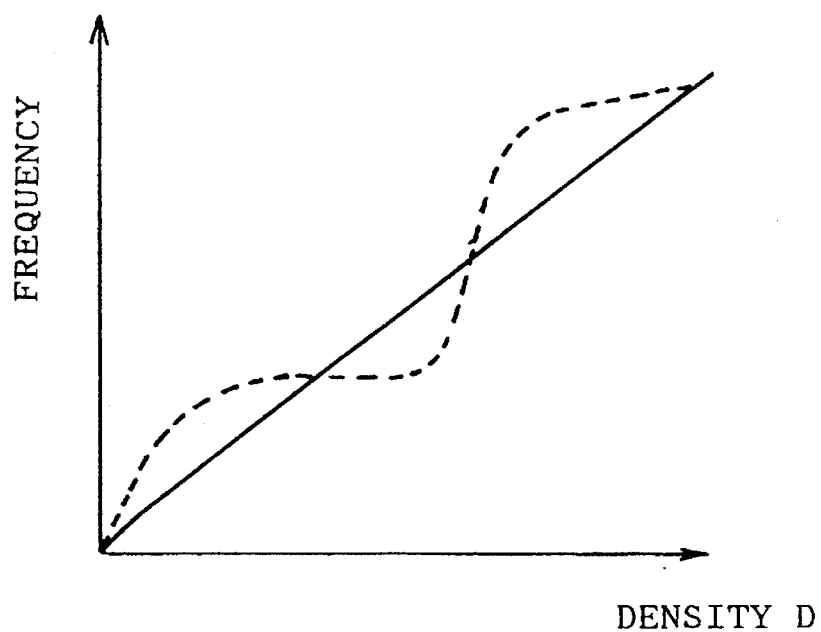
FIG. 16 is a line diagram illustrating a cumulative histogram for face densities.
Figure 17:
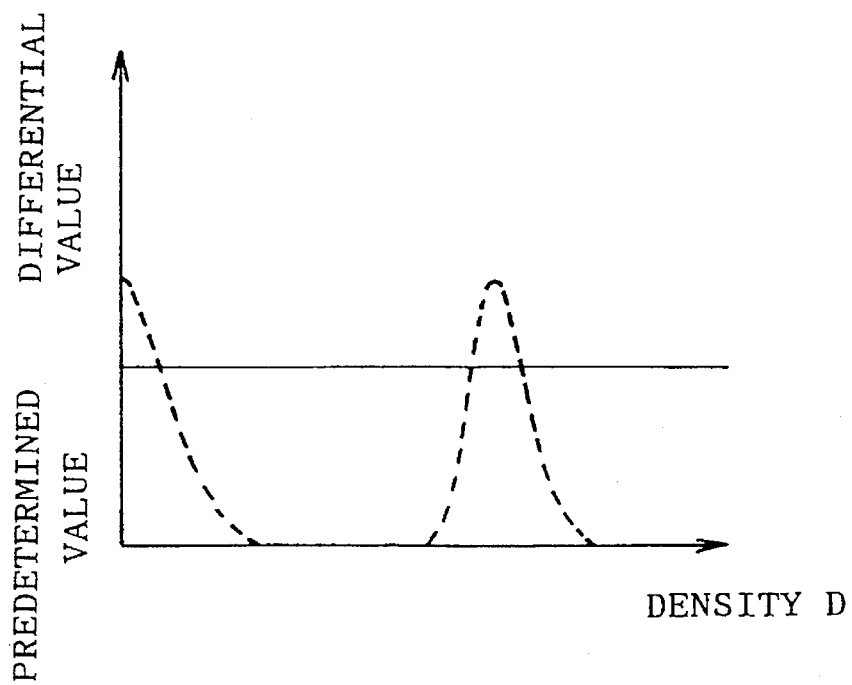
FIG. 17 is a line diagram illustrating differential characteristics.

In step 278, as illustrated in FIG. 16, a cumulative histogram is determined for densities of regions other than extracted face regions, and the process proceeds to step 280. The sums or the average values of the R, G, B three color photometric data of the regions other than the face regions extracted in the face extraction circuit 36 (i.e., the data inputted when the face flag is set) are used for the densities of the regions other than the face regions. In subsequent step 280, after smoothing of the determined cumulative histogram is effected, a differential characteristic is determined (see FIG. 17). Here, the existence of a differential value less than or equal to a predetermined value (e.g., 0) signifies the existence of stepped variations (so-called "two shoulders") in the characteristic of the cumulative histogram, as illustrated by the broken line in FIG. 16. Accordingly, in subsequent step 282, by determining whether there exists a differential value less than or equal to a predetermined value, a determination is made as to whether there are two shoulders. When the answer to this determination is "Yes", it is determined that the reflectance of the face of the photographed subject is low and that electronic flash exposure was used. The correction value $K_1$ is set to 0, and the main routine is completed.

On the other hand, if the answer to the determination in step 282 is "No", there are fewer than two shoulders, and the process proceeds to step 284 where the correction value $K_1$ is calculated on the basis of the following formula. When the calculation is completed, the main routine is completed.

$$K_a \left( \frac{D_R + D_G + D_B}{3} - \frac{FD_R + FD_G + FD_B}{3} \right) + K_t \qquad (24)$$

Here, $K_a$, $K_b$ are constants, and FD is the face region average density.

In step 288, time appropriate exposure amount $E_i$ is calculated in accordance with the following formula by using the R, G, B photometric data of the face region extracted in the face extraction circuit 36, the correction value $K_1$, and the image average density $D_i$ (wherein i is any one of R, G, B) of one frame which was calculated in the average density calculating circuit 38. The appropriate exposure amount $E_i$ is output to the driver 42. The driver 42 calculates an exposure control value from the appropriate exposure amount $E_i$ so as to control time light-adjusting filter 16.

$$log E_i = LM_i \cdot CS_i \cdot (DN_i - D_i) + PB_i + LB_{i+MBi} NB_{i+} K_1 K_2 \qquad (25)$$

Each of the notations have the same meaning as in the first embodiment. A correction value determined by a film testing device may be used as the density correction amount $K_1$ of above formula (8), and the color correction amount $K_2$ may be expressed in the following manner by using the face region average density.

$$(K_2)_i = K_c \left\{ \left( FD_i - \frac{FD_R + FD_G + FD_B}{3} \right) - \left( DN_i - \frac{DN_R + DN_B + DN_G}{3} \right) \right\} \qquad (26)$$

wherein $K_c$ is a constant.

Further, correction amounts determined by a film testing device may be used as the density correction amount $K_1$ and the color correction amount $K_2$ of above formula (8), and the average density $D_i$ of the print frame in formula (8) may be replaced by the face region average density $FD_i$ so as to calculate the amount of exposure. In this case, the density correction amount $K_1$ in step 286 is replaced by the standard average density determined in advance, and instep 284 is substituted by the extracted face region average density $FD_i$. Accordingly the routine illustrated in FIG. 15 can be implemented.

In the present embodiment, a determination is made by using the outline of the region and the structure of the inner portion. Therefore, face data can be extracted even from an image in which there are faces, ground, trees and the like which have similar hues.

Further, in the present embodiment, cases in which the reflectance of the Face of the photographed subject is low and there is no need for correction by using the face density and cases in which rear light is used and correction by using the face density is necessary are determined by the face density and the histogram of the face density. Therefore, the amount of exposure can be determined so that a human face becomes the appropriate density regardless of the races or individual differences of the photographed subjects.

Further, the present embodiment was explained with reference to a case in which the densities are photometrically measured from an image of a negative film. However, reversal film may be used as well.

As in the first embodiment, the present invention is applicable to an exposure amount determining device which is provided separately from a printer or a printer processor as illustrated in FIG. 11.

Further, as in the first embodiment, the face extraction circuit may be formed by a plurality of face extraction circuits $36_1, 36_2 \ldots 36_n$ so that the amount of exposure can be determined by parallel processing. As the method of processing is the same as that of the first embodiment, description thereof shall be omitted. Moreover, the parallel processing device is applicable to the printer shown in FIG. 1.

Other than the determination of the amount of exposure For a photographic printing device, the present invention can also be used to determined the amount of exposure of a digital color printer, to determine copy conditions of a copier, to determine the amount of exposure of a camera, to determine the display conditions of a CRT image, and to determine the amount of light when a hard copy is prepared from magnetic image data.

What is claimed is:

1. A method of determining an amount of exposure comprising the steps of:

dividing a color original image into a plurality of pixels, breaking down each of the pixels into three colors of red light, green light and blue light, and photometrically measuring the red light, green light and blue light;

determining, on the basis of data obtained by the photometry, color regions on said color original image in which hue or hue and saturation are the same or are similar;

judging whether each of said determined color regions is a human face region;- determining a density of each of said region judged to be a human face region;

classifying the human face region into classified density groups based on the determined densities when a difference between a maximum value and a minimum value of the determined densities exceeds a predetermined value; and selecting at least one of the classified density groups and determining an amount of exposure for a copy material on the basis of the selected density group.

2. A method of determining an amount of exposure according to claim 1, wherein the amount of exposure for a copy material is determined such that a density of a density group including face regions, in which a reflectance of a face of a human who is a photographed subject is greater than or equal to a predetermined value, becomes a standard density.

3. A method of determining an amount of exposure according to claim 2, wherein an average face density of the density group including face regions, in which a reflectance is greater than or equal to a predetermined value, is made to be a standard density.

4. A method of determining an amount of exposure according to claim 1, wherein when the difference between the maximum value and the minimum value of the determined densities is less than the predetermined value, an average of a plurality of average face densities is determined, and the amount of exposure for a copy material is determined based on the determined average value.

5. A method of determining an amount of exposure according to claim 1, wherein regions which are judged to be human face regions are divided into two groups on the basis of average face densities for the red light, green light and blue light, and a density value at which a ratio of dispersion between classified groups and dispersion within the respective classified groups becomes a maximum is determined, and said classifying of the human face regions into density groups is effected based on said density value.

6. A method of determining an amount of exposure comprising steps of:

dividing a color original image into a plurality of pixels, breaking down each of the pixels into three colors of red light, green light and blue light, and photometrically measuring the red light, green light and blue light;

determining a histogram of hue values based on data obtained by photomerry;

dividing said determined histogram per mountain;

judging to which of the divided mountains each pixel of said color original image belongs so as to divide the pixels into groups corresponding to the divided mountains, and dividing said color original image into the respective groups;

determining at least one of an outline and an inner structure of each of the divided regions so as to judge whether the region is a human face;

determining a density of each of said regions judged to be a human face region;

classifying the human face regions into groups of similar densities on the basis of determined densities when a difference between a maximum value and a minimum value of the determined densities exceeds a predetermined value; and selecting at least one of classified density groups and determining an amount of exposure for a copy material on the basis of a selected density group.

7. A method of determining an amount of exposure comprising the steps of:

dividing a color original image into a plurality of pixels, breaking down each of said pixels into three colors of red light, green light and blue light, and photometrically measuring the red light, green light and blue light;

determining, on the basis of data obtained by photometry, a two-dimensional histogram for hue values and saturation values;

dividing said determined two-dimensional histogram per mountain;

judging to which of the divided mountains each pixel of said color original image belongs so as to divide the pixels into groups corresponding to the divided mountains, add dividing said color original image into the respective groups;

determining at least one of an outline and an inner structure of each of the divided regions so as to judge whether the region is a human face;

determining a density of each of said regions judged to be a human face region;

classifying the human face regions into groups of similar densities on the basis of the determined densities when a difference between a maximum value and a minimum value of the determined densities exceeds a predetermined value; and selecting at least one of the classified density groups and determining an amount of exposure for a copy material on the basis of said selected density group.

8. A method ofl determining an amount of exposure comprising the steps of:

dividing a color original image into a plurality of pixels, breaking down each of the pixels into three colors of red light, green light and blue light, and photometrically measuring the red light, green light and blue light;

determining, on the basis of data obtained by photomerry, color regions on said color original image in which hue or hue and saturation are the same or are similar;

judging whether a determined color region is a human face region;

determining a density of a region judged to be a human face region;

determining an amount of exposure for a copy material with correction, on the basis of a density of a region, for a color original image in which a reflectance of a face of a human who is a photographed subject corresponding to the determined density is greater than or equal to a predetermined value; and determining an amount of exposure for a copy material without effecting correction, on the basis of a density of a region, for a color original image in which a reflectance of a face of a human who is a photographed subject corresponding to the determined density is less than a predetermined value.

9. A method of determining an amount of exposure according to claim 8, wherein correction is effected for a color original image, in which a reflectance of a face of a human who is a photographed subject corresponding to the determined density is greater than or equal to a predetermined value, such that an average density of the regions becomes a standard density.

10. A method of determining an amount of exposure according to claim 8, wherein an amount of exposure for a copy material is determined without effectlag correction on the basis of the density of the region when the determined density exceeds an upper limit value or is less than a lower limit value, and an amount off exposure for a copy material is determined on the basis of the density of the region in a case in which the determined density is included in a predetermined range between the upper limit value and the lower limit value.

11. A method of determining an amount of exposure according to claim 10, wherein the upper limit value is a target face density value of the photographed subject, and the lower limit value is a standard value for determining whether correction of an image photographed by rear light is to be effected.

12. A method of determining an amount of exposure according to claim 11, wherein the target face density value of the photographed subject is determined in accordance with a race of the photographed subject.

13. A method of determining an amount of exposure according to claim 8, wilerein an amount of exposure for a copy material is determined without effectlag correction on the basis of the density of the region in one of a case in which there is appropriate exposure, rear light or overall underexposure when the reflectance of the face of the photographed subject is substantially low, and a case in which there is strong rear light when the reflectance of the face of the photographed subject is standard.

14. A method of determining an amount of exposure according to claim 10, wherein, in a case in which the determined density is included in a predetermined range between the upper limit value and the lower limit value, a histogram of densities of color regions other than regions assumed to be human face regions is determined, and it is assumed on the basis of the determined histogram whether there was electronic flash exposure, and an amount of exposure for a copy material is determineci on the basis of the densities of the regions at times other than those at which it is assumed that there was electronic flash exposure.

15. A method of determining an amount of exposure according to claim 14, wherein an assumption as to whether there was electronic flash exposure is made by determining whether two stepped variations exist in the histogram, and when two stepped variations exist, it is assumed that there was electronic flash exposure.

16. A method of determining an amount of exposure according to claim 10. wherein in one off a case in which there is electronic flash exposure or overall overexposure when the reflectance of the face of the photographed subject is substantially low, and a case in which there is weak rear light or overall underexposure when the reflectance of the face of the photographed subject is standard, a histogram of densities of color regions other than regions assumed to be human face regions is determined, and it is assumed on the basis of the determined histogram whether there was one of electronic flash exposure and overall overexposure, and an amount of exposure for a copy material is determined on the basis of the densities of the regions at times other than those at which it is assumed that there was one of electronic flash exposure and overall overexposure.

* * * * *